United States Patent
Konno et al.

[11] Patent Number: 5,293,438
[45] Date of Patent: Mar. 8, 1994

[54] MICROLENSED OPTICAL TERMINALS AND OPTICAL SYSTEM EQUIPPED THEREWITH, AND METHODS FOR THEIR MANUFACTURE, ESPECIALLY AN OPTICAL COUPLING METHOD AND OPTICAL COUPLER FOR USE THEREWITH

[75] Inventors: Yoshihiro Konno, Saitama; Masato Tatenuma; Hiroshi Kume, both of Tokyo; Yukihiko Mikami, Aomori, all of Japan

[73] Assignee: Namiki Precision Jewel Co., Ltd., Tokyo, Japan

[21] Appl. No.: 947,565

[22] Filed: Sep. 21, 1992

[30] Foreign Application Priority Data

Sep. 21, 1991 [JP] Japan ................... 3-270266
Apr. 6, 1992 [JP] Japan ................... 4-113051

[51] Int. Cl.$^5$ .................................. G02B 6/32
[52] U.S. Cl. .......................... 385/35; 385/61
[58] Field of Search ............... 385/31, 33, 35, 61, 385/73, 79

[56] References Cited

U.S. PATENT DOCUMENTS

| | | | |
|---|---|---|---|
| 4,456,330 | 6/1984 | Bluedaue ................ | 385/88 |
| 4,665,529 | 5/1987 | Baer et al. .............. | 385/35 X |
| 4,678,268 | 7/1987 | Russo et al. ............ | 385/33 X |
| 4,729,621 | 3/1988 | Edelman ................. | 385/33 |
| 4,737,006 | 4/1988 | Warbrick ................ | 385/33 |
| 4,755,203 | 7/1988 | Coutts ................... | 385/35 X |
| 4,807,954 | 2/1989 | Oyamada et al. ........ | 385/33 X |
| 4,854,663 | 8/1989 | Borsuk et al. .......... | 385/33 X |
| 4,893,890 | 1/1990 | Lutes .................... | 385/33 X |
| 5,185,836 | 2/1993 | Baker .................... | 385/61 |

FOREIGN PATENT DOCUMENTS

| | | | |
|---|---|---|---|
| 49-67632 | 7/1974 | Japan . | |
| 53-84738 | 7/1978 | Japan . | |
| 2-208608 | 8/1990 | Japan ...................... | 385/35 |

*Primary Examiner*—John D. Lee
*Attorney, Agent, or Firm*—Sixbey, Friedman, Leedom & Ferguson

[57] ABSTRACT

The tip of a first optical fiber 8 is fused integrally to a second optical fiber 7, having a single refractive index and an identical outer diameter, which has a spherical lens 10 with the length and diameter to produce a beam expansion by Gaussian diffusion to at least 80 μm or greater at the exit and a radius of curvature greater than 200 μm. The spherical part of the second fiber is formed by thermal fusion; a spherical lens having the desired diameter at the optical fiber tip is formed by feeding the optical fiber tip into a thermal fusion unit to form the spherical lens. An optical fiber terminal for optical coupling composed of a single mode optical fiber, a non-doped silica fiber beam expansion segment, and a non-doped silica spherical lens, is connected to a polarization-independent optical isolator. A ferrule support having a rotatable spherical segment formed at the tip, in which the second optical fiber and an optical fiber protecting material are inserted and stabilized in a through-hole of the ferrule support, and a coupling unit consisting of a flange and a cap, which contact with the spherical surface of the spherical segment at opposite sides after the ferrule support has been adjusted into a position which produces an optimal beam converging function.

17 Claims, 18 Drawing Sheets

FIG. 2  PRIOR ART
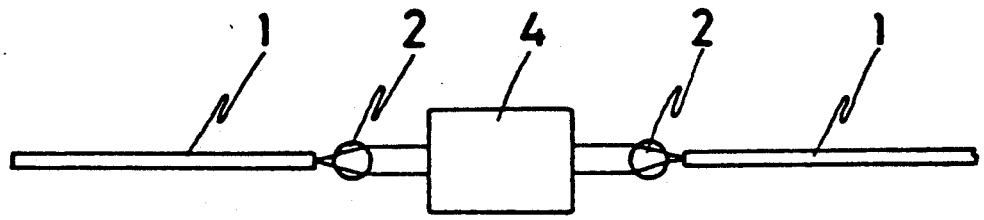
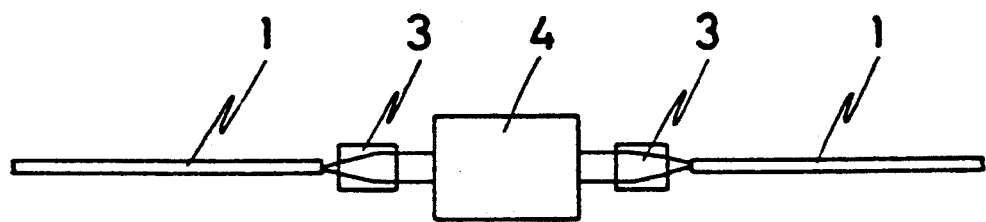
FIG. 3  PRIOR ART
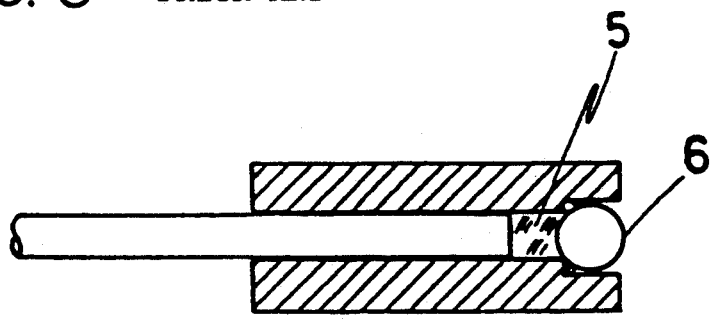
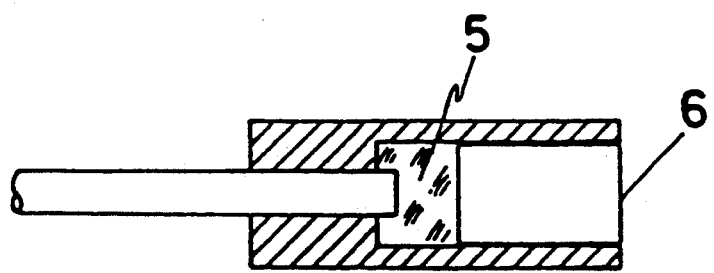

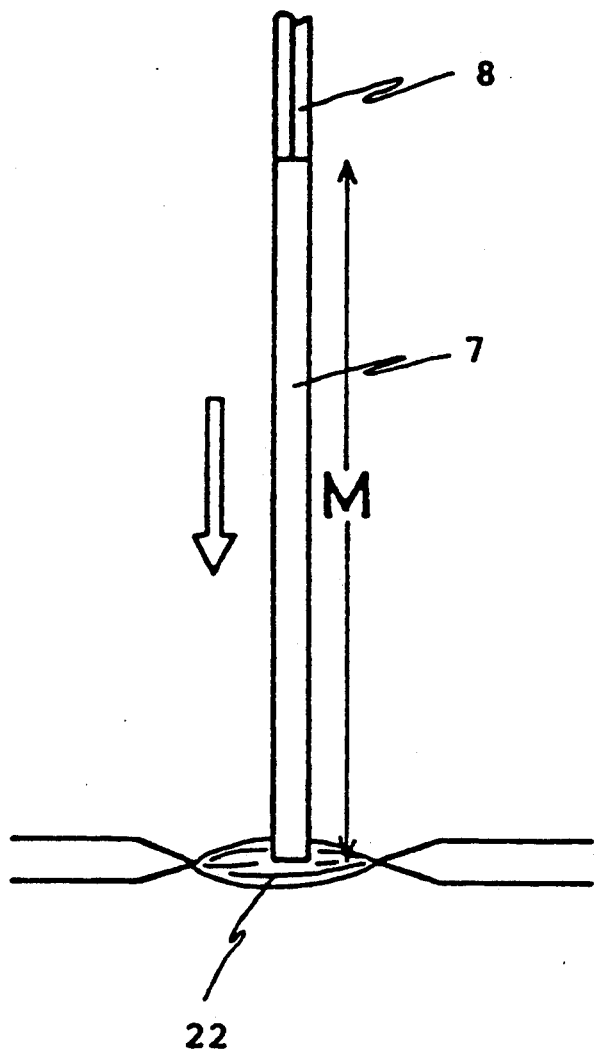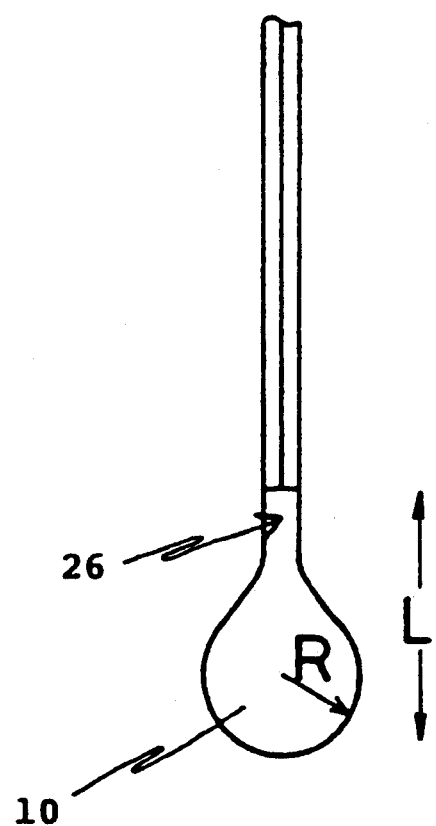

MICROLENSED OPTICAL TERMINALS AND OPTICAL SYSTEM EQUIPPED THEREWITH, AND METHODS FOR THEIR MANUFACTURE, ESPECIALLY AN OPTICAL COUPLING METHOD AND OPTICAL COUPLER FOR USE THEREWITH

BACKGROUND OF THE INVENTION

1. Field of the Invention

The invention relates to the construction of a microlensed optical fiber terminals for various parts, such as optical switches, optical merging/branching filters, optical isolators, and optical connectors, including polarization-independent optical isolators for optical amplification, as well as to such optical systems utilizing microlensed optical fiber terminals and methods for producing such terminals and optical systems. Specifically, the invention also relates to microlensed optical isolators and methods for their manufacture, especially methods of coupling optical fibers and optical couplers for performing such coupling.

2. Description of Related Art

In the development of optical communications, miniaturization of the optical devices and parts used therein has become a desired objective. In particular, optical isolators, optical circulators, and optical merging/branching filters are in demand which achieve both miniaturization and simplification when they are coupled with optical fibers. Additionally, in recent years, a distributed-feedback laser with a narrow spectrum has come into use for high speed optical communications systems which is sensitive to back reflection. Thus, it has become necessary for the terminals of optical fibers to have high return loss characteristics.

In general, in the case of pigtailed optical isolators with optical fibers, when they are coupled as shown in FIG. 2, the light emitted from optical fiber 1 enters into the optical device 4 as parallel beams from either the spherical lens 2 or the refractive index-distributed lens 3, and the exiting light is recollected into the coupled optical fiber 1 in the same manner.

Conventional collimating systems have problems adjusting the optical fiber and the optical axis position of the lens, and its fabrication is expensive, resulting in a high cost for optical fiber collimating products. Furthermore, as shown in FIG. 3, in the case of a conventional system, reflection has been prevented by using an organic substance as a refractive index matching agent 5. Consequently, there are anti-weather and anti-thermal issues. In addition, an anti-reflective film is formed onto the optical entrance and exit surface 6 shown in FIG. 3 while the optical fiber cord is attached, so that a hard coat, which requires heating to about 300° C. in the case of ordinary vapor deposition, is not used due to the heat sensitivity of the optical fiber sheath and the gas generated. Instead, ion-assist coatings are employed; but, use these coatings is disadvantageous in that they are expensive and uniformity is difficult to obtain.

Furthermore, from the standpoint of miniaturization, fiber collimator beams of sufficiently narrow (e.g. less than 200 μm) light flux are required. However, conventional optical fiber collimators are not able to obtain a light flux narrower than 300 μm, and a return loss of only approximately −27 dB was obtainable. Thus, it was necessary to use a complicated coupling configuration, such as coupling the collimator with the lens system by forming an angle at the tip of the fiber.

Still further, optical communication and transmission systems require optical amplification to compensate for optical attenuation. In recent years, electrical amplification (i.e., optical signals are converted to electrical signals which are electrically amplified and then reconverted back to optical signals) has been replacing the complicated and readily noise-overlaid conventional method of amplifying optical signals by photoelectric conversion. Techniques for optical amplification of optical signals have also been developed, such as semiconductor amplification and rare earth doped optical fiber amplification has been developed, and rapid progress in optical as well as optical fiber transmission is anticipated for information transmission media.

With regard to optical amplification, although a large amplification factor for the signal beam is a fundamental issue, it is also important that noisy signals should not be amplified. Consequently, it is believed to be essential that every optical amplification relay be equipped with an optical isolator and that the reflective return beam be cut off. Moreover, since a signal beam propagates through an optical fiber, the polarization surface fluctuates randomly. Therefore, a polarization-independent optical isolator is necessary, and at the same time, it is essential that the polarization-independent optical isolator has optical fiber terminals (pigtails) attached at both ends, so that it can be installed between optical fibers.

In response to market demand, several configurations have been proposed for a polarization-independent optical isolator with pigtails, and representative examples thereof are shown in FIGS. 4–6. More specifically, FIG. 4 shows a method using wedge-form birefringent plates 11 where, in the case of a pigtailed optical isolator, having a Faraday rotator 15 and optical fibers 1 at both ends, generally, optical coupling is performed by having the beam emitted from one optical fiber 1 enter the optical device as a parallel beam by means of a spherical lens 2, or a refractive index-distributed lens, and converge into the other optical fiber 1 in the same manner after exiting.

In optical coupling systems of the type described relative to FIG. 2, in the preceding paragraph, a problem exists in adjusting the optical fibers and the optical axis position of the lens, which must be performed at the submicron level, and is costly in assembling equipment, etc. That is, the two optical fibers and two lenses are independent parts which must be mutually aligned, resulting in an expensive collimating system, and optical coupling efficiency greatly decreases as a consequence of shifts in the optic axis and the angles between the optical fiber and the lens. However, for optical systems including optical fiber collimator products and optical fiber coupling systems, they are relatively simple as compared to configurations as shown in FIGS. 5 & 6.

The configuration of FIG. 5 has advantages, such as the use of a parallel birefringent plate 14, whereby the special processes shown in FIG. 4 are unnecessary. By arranging the magnetic orientation of the Faraday rotator 15 in the reverse direction, the temperature characteristics inherent to a Faraday rotator can be mutually compensated. However, it is a complicated configuration with a large number of components.

The configuration of FIG. 6 is an intermediate construction. There are no small high performance materials serving as active substances for the optically active plate 16. When the most suitable crystalline plate is used, a thickness of approximately 11 mm in the 1310 nm band and approximately 15 mm in the 1550 nm band are required. A half-wave plate may also be used instead of the optically active substance; it is still functional after it gets worn. However, the shortcoming exists that angular fluctuations with respect to the optical axes are severe due to the development of elliptical components caused by changes in plate thickness. In addition, since optically parallel shifts are used as the isolation method in both FIGS. 5 & 6, it is necessary to sufficiently narrow the light flux of the Gaussian beam propagating between the optical fibers. Although, at less than 60 μm, an interlens distance of less than 5 mm is obtainable at most. As a result, building of an optical system becomes a problem.

The optical isolator configurations described above have both merits and demerits; it is difficult to judge their technical and economic advantages and disadvantages. Nonetheless, when coupled with optical fibers, the return loss from the ends of the optical fibers and lens surfaces must be controlled in all of these configurations so as to be kept at or above the optical isolator characteristics. Preferably, a return loss of above $-50$ dB is necessary. The most universal and accurate near-end reflected beam control methods are those of FIGS. 4–6, in which a configuration is proposed for the adhesion of optical fibers 1 to a one-side gradient glass 17 having a refractive index equal to refractive index matching resin. A high return loss of approximately $-60$ dB is assured; but, the configuration is complicated. The shortcoming of an increased number of components has not been avoided, and because adhesion involves the use of organic substances on the one-side gradient glass, shortcomings in terms of weather and temperature resistance exist. In other words, a polarization-independent optical isolator with pigtails requires detailed designs not only with respect to isolator construction, but also in implementation of optical coupling between the pigtails. To date, there has been no economical method developed which overcomes these technical drawbacks and which can be advantageously used for mass production.

In recent years, attempts have been made to form microcollimator beams. In the *Journal of Lightwave Technology*, Vol. LT-5, No. 9(1987), William L. Emkey et al. propose coupling microcollimator beams as narrow as 40 μm by fusing a multimode refractive index-distributed fiber (called "MMGIF" hereafter) to a single mode fiber (called "SMF" hereafter), and they reported an optical coupling system at a distance of up to about 3 mm is obtainable at a coupling loss of 0.1–1.6 dB. The method of its manufacture involves an arc-discharge fusion of SMF 18 to MMGIF 19 as shown in FIG. 7(a), and cutting of the MMGIF 19 to a desired length, as shown in FIG. 7(c), by scratching with a scribing tool 20 as in FIG. 7(b). In this case, the lens 21, which has a convergent function and a system for controlling the convergent pitch length, is formed by the MMGIF itself.

However, in the configuration using a MMGIF and a SMF, there are shortcomings such as the fact that a light flux of more than the MMGIF core diameter is theoretically impossible, so that a greater value than 50–62.5 μm is impossible. Also, because of the sharp decrease in the coupling loss at a distance of over 3 mm, consequently, there is no degree of freedom in the collimating distance. Furthermore, the distribution of the refractive index in the MMGIF fiber segment and adjustment of the wavelength pitch in the manufacturing process must be determined individually, which is unsuitable for mass production and is also expensive.

With regard to this problem, Kevin J. Warbrick proposed an SMF and a non-doped silica fiber lens optical system in Japanese published patent application S 61-264304 as an attempt to solve this problem. However, the curvature of the lens segment is restricted to a lens radius of 62.5 μm due to diffraction loss. Thus, the beam obtained is approximately 60 μm, and structurally, about 80% is, at most, the limit for the silica fiber diameter, which is too narrow for insertion into an optical device. In other words, a beam of about 60 μm is, conversely, too narrow and unsuitable for interlens coupling 82 by inserting a polarization-independent optical isolator into an optical device, i.e., for light coupling with a Gaussian Beam. Therefore, the real problem is to how to produce a 60–200 μm beam.

In Japanese published patent application H1-126609, a manufacturing process is disclosed in which the SMF tip is heated in an acr-discharge to form a spherical lens at an optical fiber tip. When this method is used, a beam converging system with a longer coupling distance than in the previously described case of the SMF and MMGIF lens proposed by W. E. Emkey can be expected. The main characteristics of this method of forming a lens sphere are as shown in FIG. 8, and involve locating an arc heat source above an optical fiber. The optical fiber is pushed up as much as necessary into a guide hole through a narrow hole of approximately the outer diameter of the optical fiber and fused in the arc discharge unit positioned directly above it.

However, since the fusion unit is above the fiber, the radius of curvature of the spherical surface is enlarged on the beam axis due to the effects of gravity, and the return loss has the potential to be relatively high. Additionally, when a relatively long interlens space of greater than 5 mm is desired, the spherical lens segment must be enlarged and the radius of curvature increased. Therefore, it is difficult to manufacture a highly symmetric sphere.

The present inventors proposed, in Japanese patent application No. H3-17022, an optical fiber terminal for optical coupling as a means for solving the above-mentioned shortcomings and which is essentially composed of an SMF, a non doped silica fiber beam expansion segment, and a non-doped silica spherical lens. As represented in FIG. 9, a first optical fiber is joined to a second optical fiber having the same outer diameter with a refractive index equivalent to the first fiber core. However, in actual mass-production, due to fluctuations in manufacturing parts, relaxing the precision of the beam angle shift θ was more important than shifts in the direction of the axes X and Y (see FIG. 1(a) for the axes directions and FIG. 10 which shows that slight shifts in aligning angles θ lead to parabolic increases in optical coupling losses to an extent that an angle shift of less than 0.1" must be achieved to obtain a coupling loss of less than the currently required value of 0.2 dB). In addition, the return loss generated from the lens tip had to be controlled to a very small value depending on the field of application. For example, in the case of a polarization-independent optical isolator, greater than 60 dB was necessary, and the return loss of about 40–50 dB was inadequate.

SUMMARY OF THE INVENTION

In view of the foregoing, it is a general object of the present invention to provide a microlensed optical fiber terminal and a method for its manufacture which will the above-mentioned overcome the shortcomings of the prior art.

It is a specific object of the present invention to provide an optical fiber terminal for optical coupling by which a beam can be enlarged to at least more than half of the optical fiber diameter and preferably, more than 80 μm in the transmission stage through the spherical lens segment, which lens segment has a radius of curvature of at least 200 μm to have a converting effect from a curved surface of the spherical lens to a parallel beam or beam having a utility-dependent emission angle.

A further object of the present invention is to provide a method for manufacturing a spherical tip on an optical fiber and for connecting of such resulting optical fibers which have a beam enlarging segment into an optical fiber terminal for optically coupling to an optical isolator or the like.

Yet another object of the present invention is to provide a method of an optical coupling system and an optical coupler suitable for mass-production use.

These and other objects of the invention are achieved in accordance with preferred embodiments of the invention.

Firstly, the tip of an optical fiber having a waveguide structure at the center is spliced by a fushion splicer integrally to a fiber lens of a single refractive index with the same outer diameter and consisting of either $SiO_2$ or $SiO_2$ as a main ingredient which has a formed spherical lens of the required length and radius for beam expansion by Gaussian diffusion. Specifically, a microlensed optical fiber terminal in which a first optical fiber is spliced to a second optical fiber of the same outer diameter which has a single refractive index equivalent to the first optical fiber core, and the tip of the second optical fiber is formed into a sphere with a function to control the exit angle of the optical beam; in the second optical fiber, the length of the optical fiber is set within a range where the optical beam does not come in contact with the outer circumference of the optical fiber, and an anti-reflective film which matches the wavelength band used is formed on the spherical lens at the tip; and a photoabsorbent or a refractive index matching agent having an equivalent or higher refractive index is coated on the outer circumference of the first and second optical fibers. The sphere at the tip of the second optical fiber is formed by a thermal fusion process in which the spherical lens having the target radius is formed at the tip by feeding it into a thermal fusion unit.

Furthermore, this invention proposes an optical fiber terminal for optical coupling, which is essentially composed of an SMF, a nondoped silica fiber beam expansion segment, and a non-doped silica spherical lens. The specific configuration involves the joining of the first optical fiber with a second optical fiber having the same outer diameter with a refractive index equivalent to the first fiber core. The second optical fiber has a spherical lens, formed at its end, with a diameter greater than the outer circumference. At the stage of transmission through the spherical lens segment, the beam is enlarged to at least more than half of the optical fiber diameter, i.e., 62.5 μm, preferably to more than 80 μm. In addition, it is structured to have a radius of curvature of at least 200 μm in order to show a converting effect from a curved surface of the spherical lens to a parallel beam or a beam having a utility-dependent emission angle in order to control return loss to a minimum.

This invention also proposes a method for connecting an optical fiber terminal for optical coupling, which is essentially composed of an SMF, a non-doped silica fiber beam enlarging segment, and a non-doped silica spherical lens, to a polarization-independent optical isolator. The specific configuration involves the joining of the first optical fiber with a second optical fiber of the same outer diameter with a refractive index equivalent to the first fiber core. Specifically, it consists of a process in which, when joining the first optical fiber with the second optical fiber of the same outer diameter with a refractive index approximately equal to the first fiber core, the beam enlarging segment and the spherical lens are combined, in essence, the length of the segment where the beam propagated from the SMF to the lens enlarges according to the Gaussian law and the length of the non-doped silica fiber for controlling the radius of curvature of the spherical lens are strictly set, and fused to the SMF; a process in which the spherical volume forming the spherical lens segment of the nondoped silica fiber fused is calculated as the silica fiber length of an approximately equivalent volume by using the designed radius of curvature; and a process in which the fused side is directed downward and the entire optical fiber is stabilized vertically, which is subsequently lowered toward the heat source that generates a temperature for melting the silica fiber.

The inventive method for constructing an optical coupler involves an optical fiber and a fiber collimator being inserted into a ferrule with a sphere formed at the tip. A spherical segment is clamp-secured with a coupling unit consisting of a flange and a cap which come in contact with the spherical segment. By designing the coupling structure to have a spherical surface which is rotatable at the coupling unit, the ferrule spherical segment and the coupling unit are fixed at a position with the least amount of coupling loss, i.e., the position of minimum angle shift, by measuring the optical coupling losses and collimating.

The configuration of the optical couples of this invention consists of a ferrule support material having a spherical segment formed at the tip, in which an optical fiber with a tip beam converging function and an optical fiber protecting material are inserted and stabilized in the through-hole along its central axis; which is clamp-secured with a flange and a cap, one coupling from the fiber side and the other, from the spherical tip which are in mutual contact with the spherical surface of the spherical segment.

The method for optical coupling of this invention is accomplished by means of a ferrule support material having a spherical segment formed at the tip, in which an optical fiber with a tip beam converging function and an optical fiber protecting material are inserted and stabilized in the through hole along its central axis; and a coupling unit consisting of a flange and a cap, one coupling from the fiber side and the other, from the spherical tip side, are in mutual contact with the spherical surface of the spherical segment; in which the ferrule support unit with the tip sphere is made rotatable and fixed after adjusting the ferrule support material and the coupling unit to be positioned to produce an optimal beam converging function.

This invention also proposes a converging beam coupling method for providing fiber coupling suitable for mass-production. In other words, by having the structure comprising the beam-expansion segment which maximally enlarges the beam guided from the SMF to the lens exit, and a converging-lens segment with a smaller radius of curvature than the lens used for collimator coupling for converging the enlarged beam into as small a cross-section as possible, so that both (i) relaxation of adjustment precision with respect to angle shifts, and (ii) control of the reflective return beam, can be achieved.

These and other objects, features and advantages of the present invention will become more apparent from the following detailed description when viewed in conjunction with the accompanying drawings.

BRIEF DESCRIPTION OF THE DRAWINGS

FIGS. 19(a) & (b) are schematic diagrams of a method of manufacturing an optical fiber terminal spherical lens of this invention;

DETAILED DESCRIPTION OF THE PREFERRED EMBODIMENTS

In accordance with a first aspect of this invention, which is directed to a configuration for solving the above-mentioned shortcomings, in the tip of an optical fiber having a waveguide structure at the center is fused integrally to a fiber lens of single refractive index with the same outer diameter and consisting of either $SiO_2$ or $SiO_2$ as a main ingredient which has been formed into a spherical lens of the required length and radius for a beam expansion by Gaussian diffusion.

Specifically, it is a microlensed optical fiber terminal in which the first optical fiber is spliced to a second optical fiber of the same outer diameter which has a single refractive index equivalent to the first optical fiber core, and the tip of the second optical fiber is formed into a sphere with a function to control the exit angle of the optical beam; in the second optical fiber, the length of the optical fiber being set within a range where the optical beam does not come in contact with the outer circumference of the optical fiber, and an anti-reflective film, which matches the wavelength band used, is formed on the spherical lens at the tip; and a photoabsorbent or a refractive index matching agent having an equivalent or higher refractive index is coated on the outer circumference of the first and second optical fibers. As for the manufacturing method, the sphere at the tip of the second optical fiber is formed by a thermal fusion process in which the spherical lens having the target radius is formed at the tip by feeding it into a thermal fusion unit.

Figure 1A:
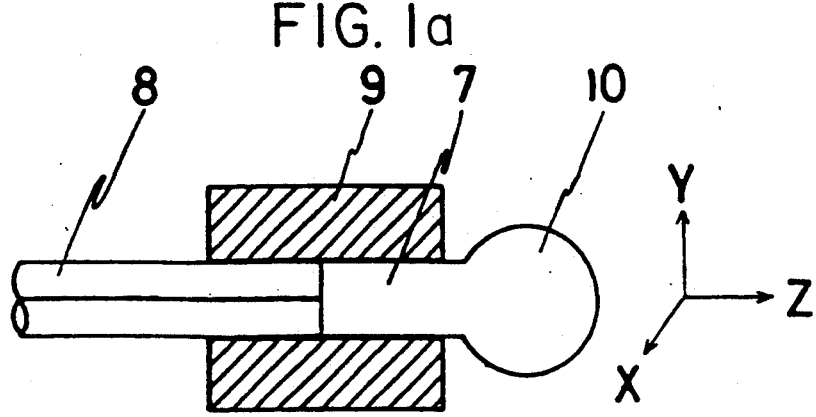
FIG. 1(a)-(d) are cross-sectional views showing optical fiber terminals of this invention.
Figure 1B:
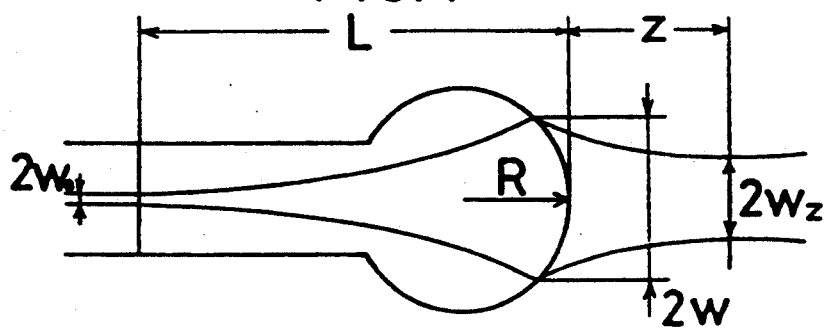

More specifically, the tip of the optical fiber terminal of this invention is constructed as shown in the FIG. 1(a) example. It comprises an $SiO_2$ fiber lens tip 7, a pigtailed main fiber 8, a ferrule 9 for protecting the tip 7, and a tip lens 10. It is also feasible to omit ferrule 9. FIG. 1(b) shows the transmission state of the beam; when the distance to the convergent point of the beam (beam waist) emitted from the SMF main fiber 8 is z, and the refractive index of $SiO_2$ at the wavelength $\lambda$ is n, the Gaussian beam expansion for the beam propagating through the fiber lens 7 is shown by the Formula 1.

$$\frac{w}{w_0} = \sqrt{1 + \left(\frac{\lambda}{\pi n w_0^2}\right)^2 \cdot L^2} \quad \text{[Formula 1]}$$

In other words, the beam can be enlarged to a size close to or greater than the optical fiber diameter if the spread of the spherical lens segment is also taken into consideration by controlling the length L, from the position at which the SMF 8 is spliced with of the second optical fiber 10, to the spherical lens exit. As a result, it is possible to achieve optical coupling with little coupling loss even as the beam waist distance is enlarged.

An $SiO_2$ fiber of 10 μm core diameter, 125 μm outer diameter and a core refractive index of approximately 1.47, with the outer diameter, 125 μm being the same as the SMF main fiber, is used. At a wavelength of 1.31 μm, the maximum length L based on Formula 1, $L_{max}$, may be any number below approximately 1.1 mm. In FIG. 1(b), the beam lines of the SMF beam to the beam waist has the relationship shown in Formula 2 when the curvature of the SiO2 fiber tip lens is R.

$$\begin{pmatrix} A & B \\ C & D \end{pmatrix} = \begin{pmatrix} 1 & z \\ 0 & 1 \end{pmatrix} \begin{pmatrix} 1 & 0 \\ \frac{1-n}{R} & n \end{pmatrix} \begin{pmatrix} 1 & L \\ 0 & 1 \end{pmatrix} \quad \text{[Formula 2]}$$

Figure 11:
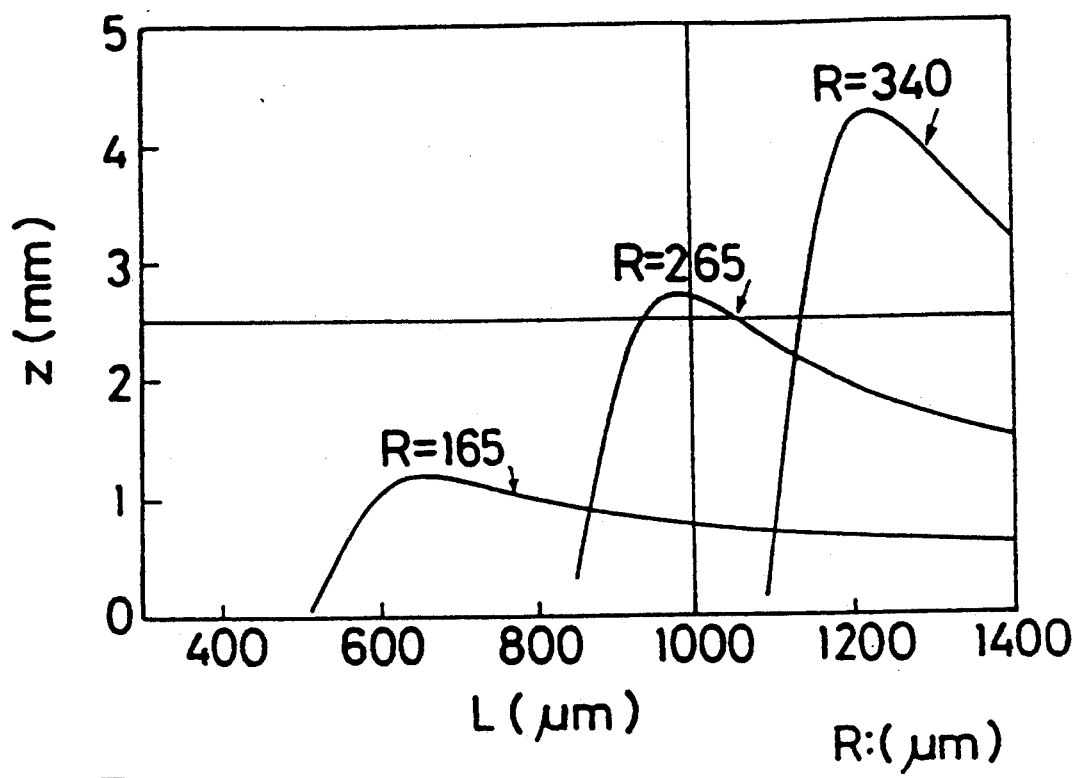
FIG. 11 is graphic depiction of the calculated values for an optical fiber collimator in which the maximum coupling efficiency of this invention can be obtained.

FIG. 11 shows the results of calculations of the radius of curvature R of the spherical lens, the length L and the distance to the beam waist z where the maximum coupling efficiency is obtainable. As can be seen from this figure, z=2.5 mm or greater (i.e., the interlens distance: z=2.55 mm or greater) can be realized when L≧1000 μm; this is also true when the condition of 250 μm or greater is satisfied for curvature R of the spherical lens. At this point, the light flux of the exit beam becomes greater than 90 μm. Since the light flux can be made broader than with a conventional fiber collimator, the interlens distance can be enlarged by that much.

Based on the above facts, it is possible to obtain the high coupling efficiency which is an objective of this invention if, in essence, the diameter of the light flux of the Gaussian distributed-beam is greater than 80 μm at the lens exit. In order to converge the beam as a parallel beam or to have a limited beam waist, the radius of curvature of the spherical lens for beam conversion should be at least 200 μm. This can be estimated from the beam lines of the light from the SMF to the limited beam waist in FIG. 1(b), and can be derived from the relational expression in Formula 2, above.

In addition, from the Gaussian beam equation, Formula 3 results, and the distance to the beam waist z is obtained.

$$z = \frac{\left(\frac{n-1}{R}\right) - a^2 L \left(n - \left(\frac{n-1}{R}\right)L\right)}{\left(\frac{n-1}{R}\right)^2 + a^2 \left(n - \left(\frac{n-1}{R}\right)L\right)^2} \quad \text{[Formula 3]}$$

where $a = \lambda/\pi n w_0^2$.

From Formulae 2 and 3 and the Gaussian beam formula, Formula 4 can be derived and the results shown in FIG. 11 obtained.

$$w_z^2 = \left(\frac{\lambda}{\pi w_0}\right)^2 \cdot \frac{1}{n} \cdot \left(\frac{a^2 c^2 + D^2}{AD - BC}\right) \quad \text{[Formula 4]}$$

A value of L=0.7 mm was selected by calculating from Formula 1, so that the expanded beam diameter is 80 μm. In this case, the expanded beam diameter is double the beam diameter, 40 μm, of the previously mentioned conventional proposal. The SiO2 fiber tip spherical lens curvature R greatly affects the beam waist position z and the beam diameter $2W_z$. Table 1 shows the relationship.

TABLE 1

| R (μm) | z (mm) | $2W_z$ (μm) |
|---|---|---|
| 45 | 0.116 | 4.8 |
| 75 | 0.230 | 9.6 |
| 105 | 0.395 | 16.5 |
| 135 | 0.652 | 27.5 |
| 165 | 1.08 | 47.2 |
| 195 | 1.77 | 88.1 |
| 265 | 2.60 | 92.0 |
| 340 | 4.50 | 118.0 |

[exit beam diameter, 2w = 90 μm]

Figure 1C:
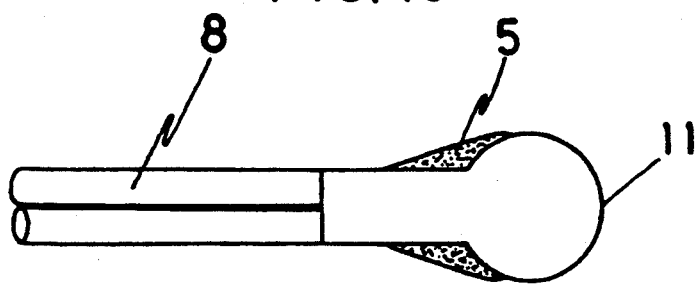
Figure 1D:
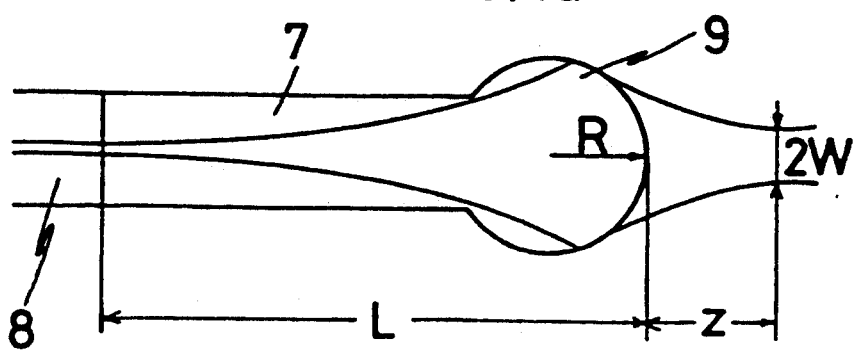
Figure 2A:
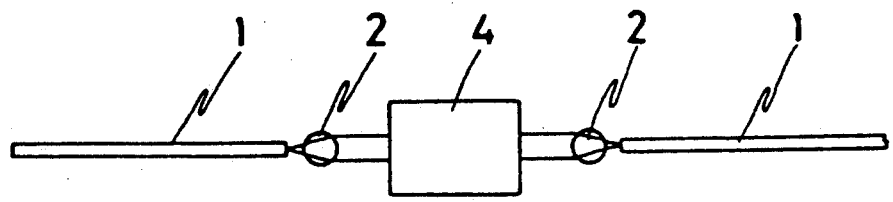
FIG. 2 is schematic diagram of a prior art optical system with an optical fiber.
Figure 2B:
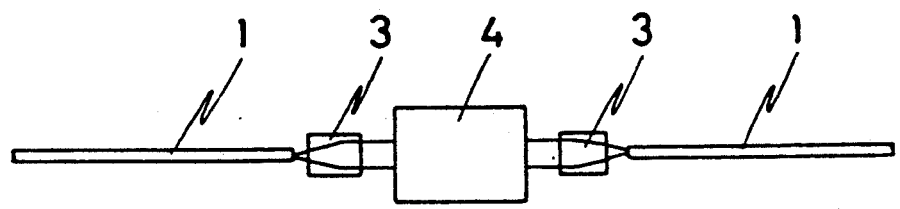
Figure 3A:
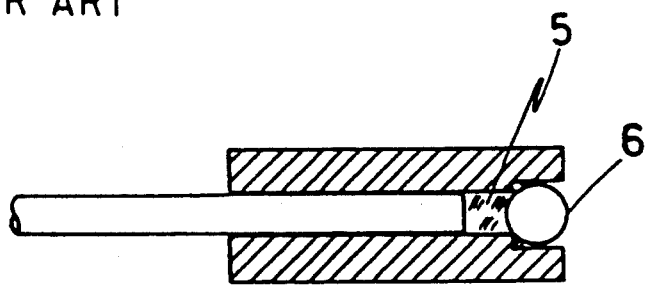
FIG. 3 is cross-sectional view of a conventional optical fiber collimator.
Figure 3B:
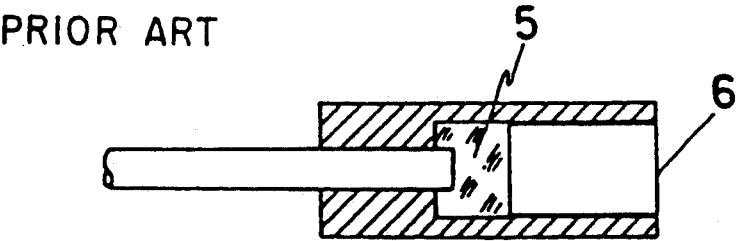
Figure 4:
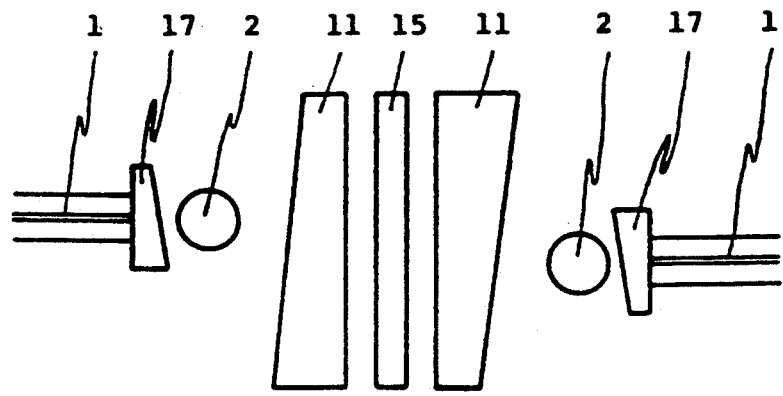
FIGS. 4-6 are schematic diagrams of conventional, pigtailed polarization-independent optical isolators.

Consequently, at the curvature R=200 μm, the beam waist position is approximately 1.8 mm, and the beam diameter is 88 μm. With the beam waist as the center of symmetry, an identical optical system was measured at the opposite position; the lens-to-lens distance was 3.6 mm, and the coupling loss was 0.5 dB. A return loss of −45 dB was achieved by applying an anti-reflective film 11 and a refractive index matching agent 5 as shown in FIG. 1(c).

Figure 12:
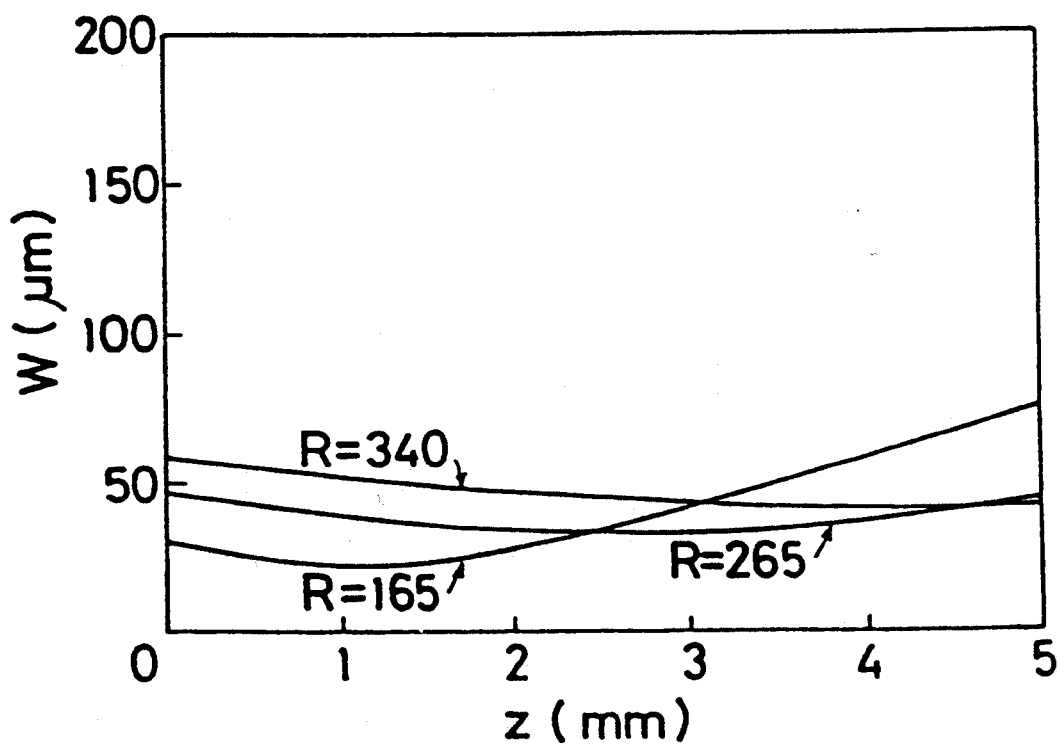
FIG. 12 is a graphic depiction of a beam radius in the Z-axis direction after exiting from the spherical lens of this invention.

FIG. 12 shows the beam radius in the direction of the Z axis (see FIG. 1(a)) following emission from the spherical lens. At a curvature of R=165 μm, the beam is 60 μm at the exit, but the beam at the beam waist position (=2$W_z$) converges to approximately 30 μm. Although it deviates from the main theme of this invention, at R=200 μm or greater, a suitable beam results; for example, at R=265 μm, 2$W_z$=92 μm, and 2z=5.2 mm; and at R=340 μm, 2$W_z$=118 μm, and 2z=9.0 mm, thus satisfying the required conditions.

Figure 13:
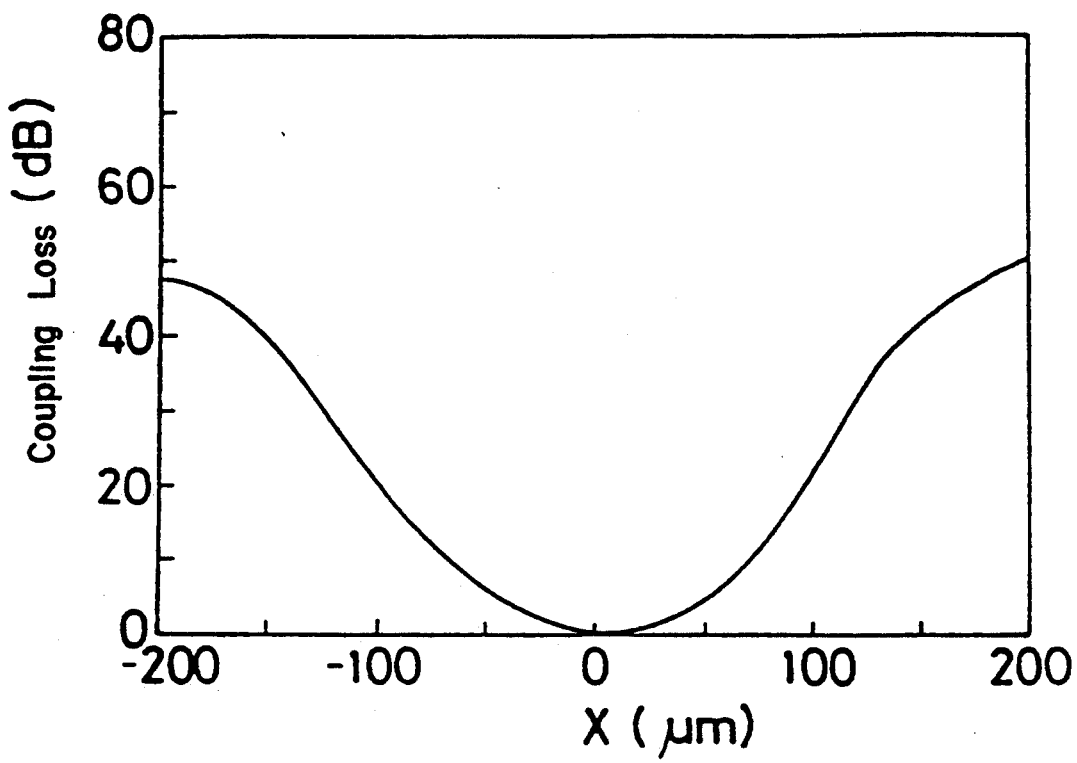
FIG. 13 is a graphic depiction of actual measurements of coupling loss with respect to displacement in the X-axis direction of an optical fiber collimator of this invention.

FIG. 13 shows the measured coupling losses with respect to displacements in the X-axis direction for a pair of opposing optical fiber terminals, i.e., silica fibers having a spherical lens of length L=950 μm, curvature R=265 μm, and 2z=7.0 mm of this invention spliced to SMFs with core diameters of 10 μm. They were both 0.4 dB at a minimum without applying an anti-reflective film, which enabled the allowable position-shift of approximately 20 μm to be confirmed. A return loss of −45 dB was achieved by providing the antireflective film 11 and refractive index matching agent 5 as shown in FIG. 1(c); values equal to the conventional non-reflective connector were obtained. At this time, the performance of a conventional non-reflective connectors deteriorate upon repeated attachment/detachment because of mutual physical butting; whereas no such physical damage occurs in the case of the fiber system of this invention since the beams are propagated through space.

Figure 14:
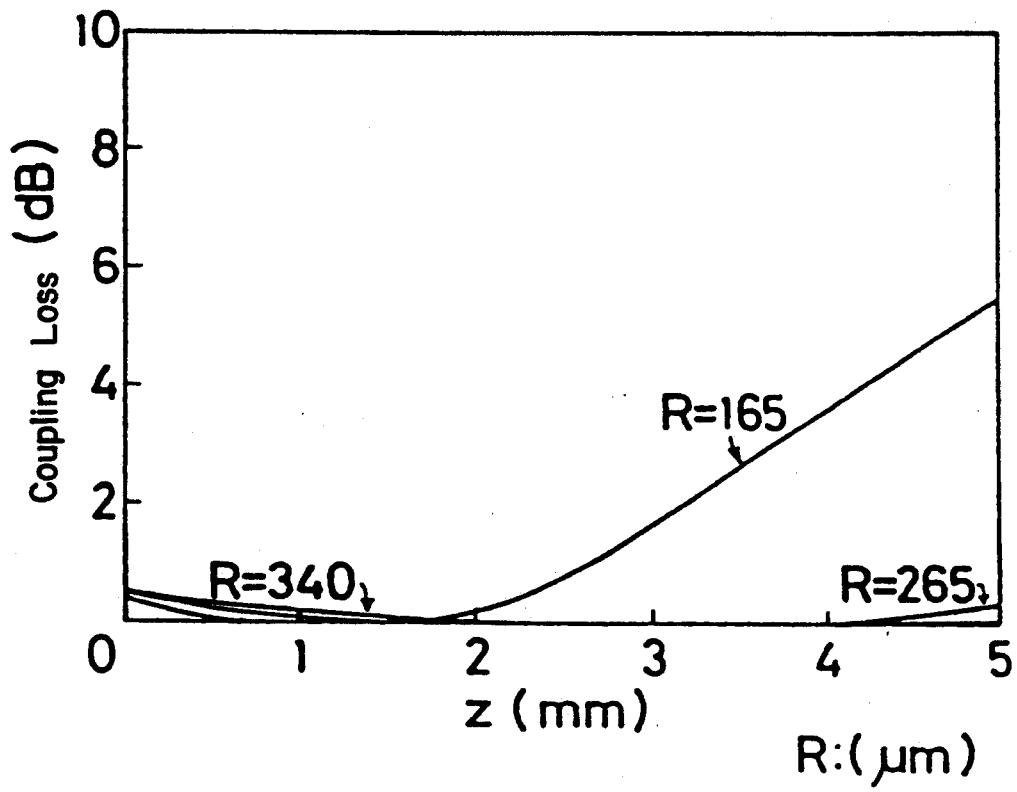
FIG. 14 is a graphic depiction of calculated values of coupling loss with respect to position-shifts in the Z-axis direction for lens curvatures according to this invention.
Figure 15:
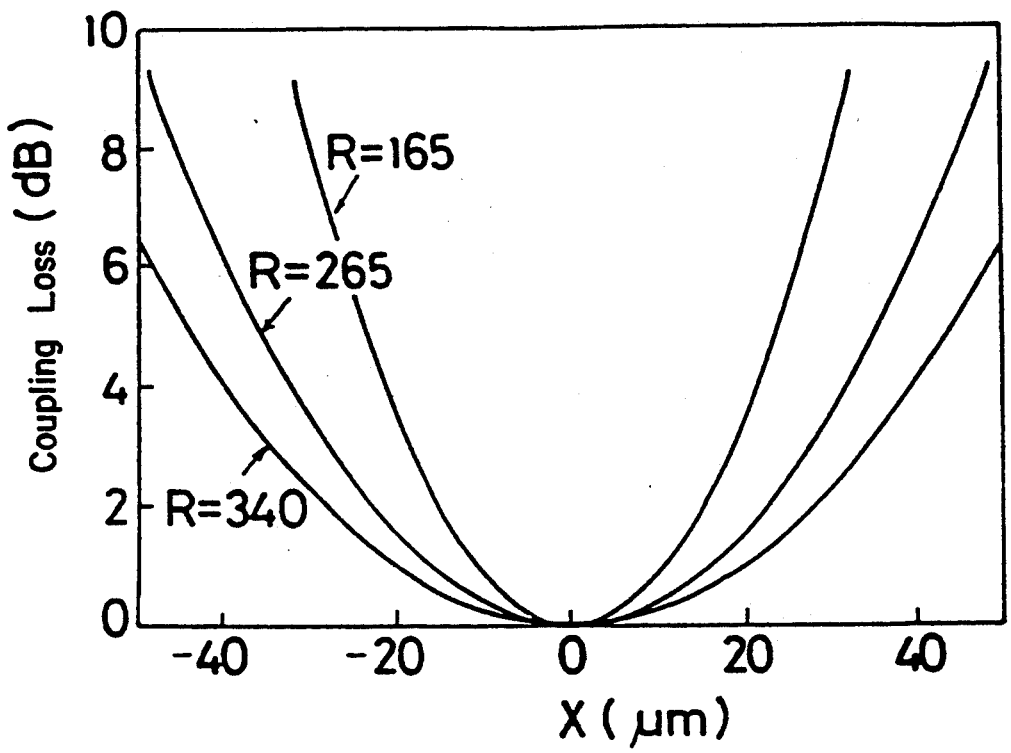
FIG. 15 is a graphic depiction of calculated values of coupling loss with respect to position-shifts in the X-axis direction for lens curvatures according to this invention.

In addition, in the case of a conventional microfiber collimator, the distance in which propagation at high optical coupling efficiency is achieved is approximately 3 mm or less, which is shorter than the actual distance of 3–10 mm in the case of this invention. Furthermore, as shown in FIGS. 14 and 15, the allowable position shifts become narrower as the conditions presented are for small lens curvature and narrow light flux. This is contrary to the effect of this invention, in which a wide tolerance zone exists in the value range with respect to not only the beam direction (Z axis direction), but also in the directions perpendicular to the beam (X and Y axes). In other words, it can be inferred from the previously mentioned computation formula that the greater the lens curvature in FIG. 14, the more relaxed is the allowable position with respect to coupling the Z axis direction.

Figure 16:
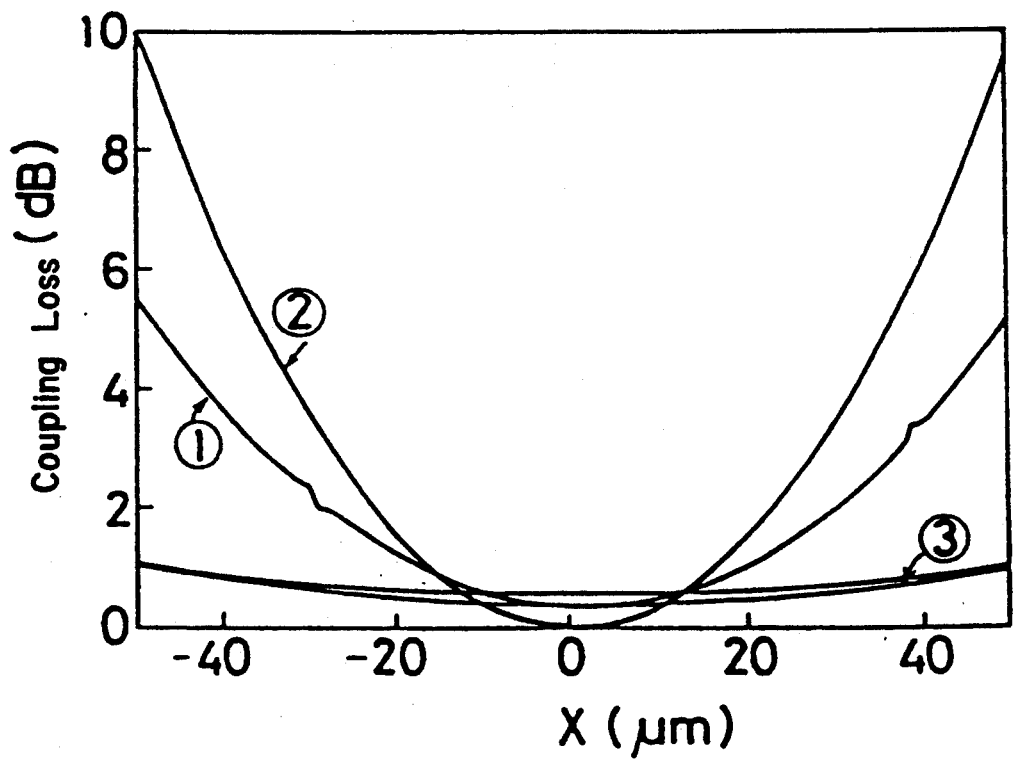
FIG. 16 is a graphic depiction of a comparison between the calculated and the measured values of coupling loss with respect to position-shifts in the X-axis direction of optical systems according to this invention.

FIG. 15 similarly shows the tolerance regarding lens curvature and position shifts in the X-axis direction. Clearly, as the curvature increases, the allowable position becomes more relaxed, thus facilitating manufacture. FIG. 16 is a graphic representation of 1) measured coupling losses with respect to the X-axis position shifts in the above-mentioned optical system of this invention compared with 2) calculated estimates. It also shows a graph for 3) a collimator system using a commercial refractive index-distributed lens. The coupling system of this invention has a narrow range of freedom, but the commercial optical system has a light flux as wide as 700 μm; it has an entirely different focus from this invention. As can be seen from this figure, the coupling system of this invention is capable of producing a coupling loss equal to or less than that of the commerical collimator coupling system.

When coupling efficiency was measured by constructing two pigtails with an SMF core diameter of 10 μm/outer diameter of 125 μm, silica lens length L=890 μm, and R=273 μm, and by using a 6-mm space, the following values were obtained. This confirmed satisfactory performance and proved that a one-end gradient glass can be used without joining with an SMF, which was previously considered necessary for conventional pigtails.

Insertion loss=0.3 dB
Beam diameter=100 μm
Return loss=−56 dB

Figure 5:
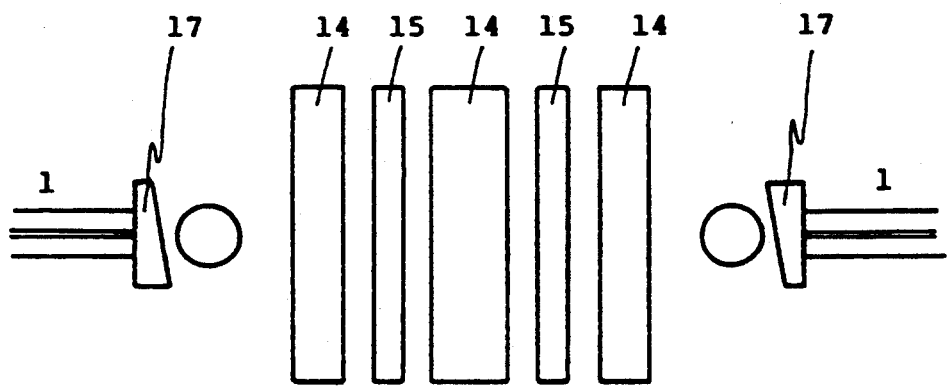
Figure 6:
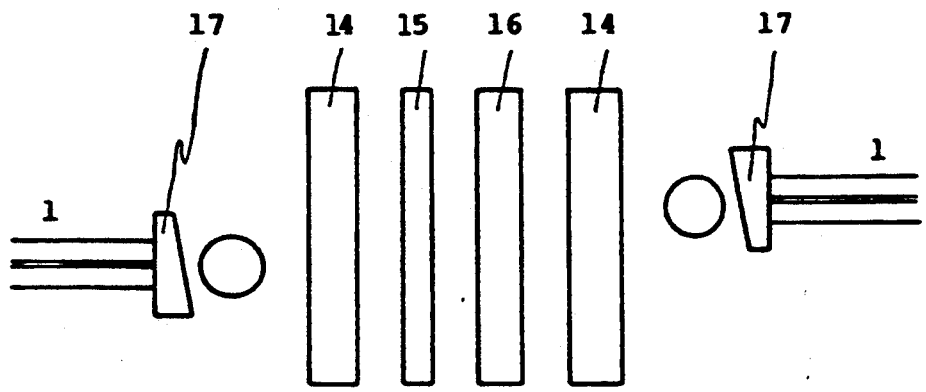
Figure 7A:
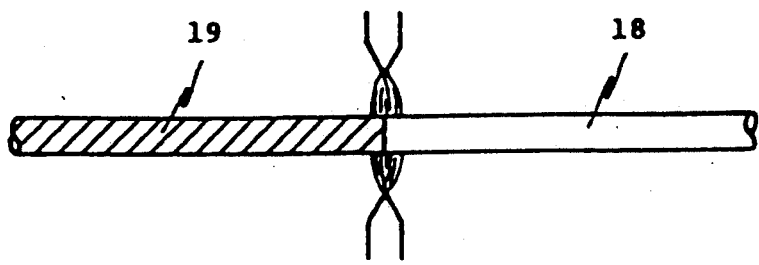
FIGS. 7(a)-(c) are diagrams for illustrating a conventional process of manufacturing an optical fiber lens.
Figure 7B:
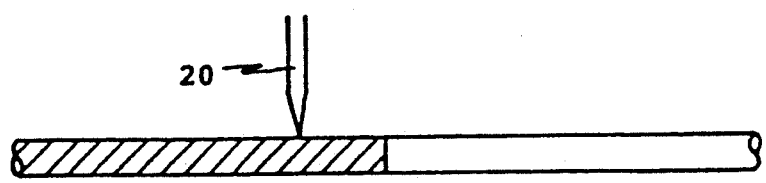
Figure 7C:
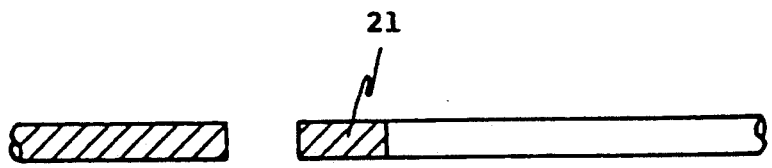
Figure 8:
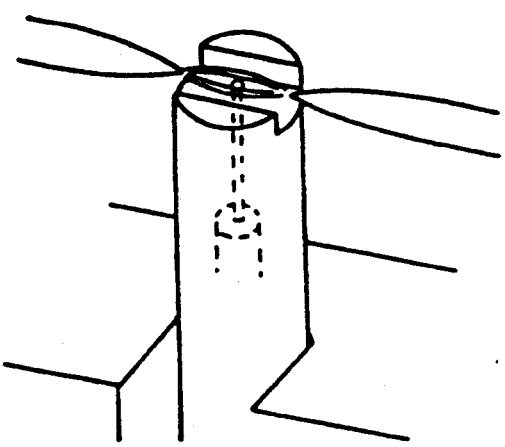
FIG. 8 is a perspective view of manufacturing equipment for producing a conventional optical fiber spherical lens.
Figure 9:
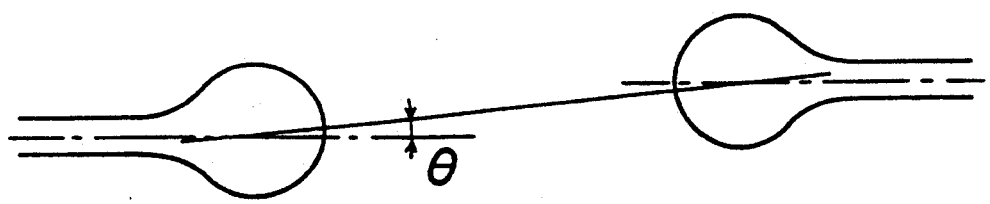
FIG. 9 depicts the relationship of two optical fibers as they are conventionally arranged for optical coupling.
Figure 10:
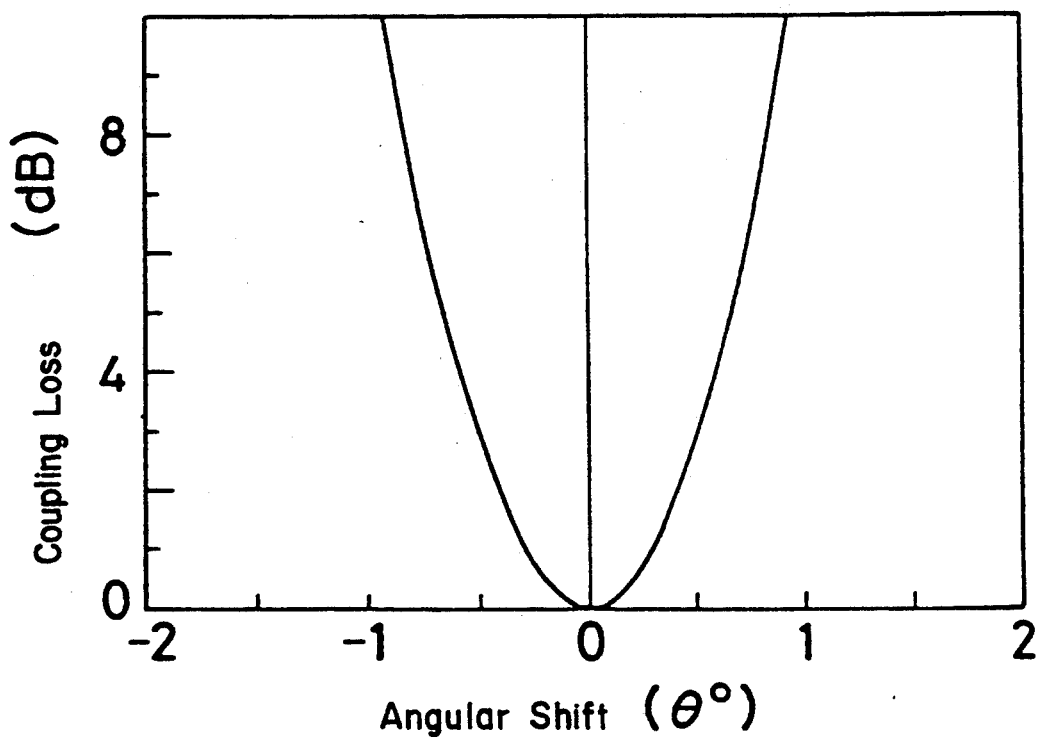
FIG. 10 is a graph depicting coupling losses (in dB), resulting from the conventional optical coupling systems represented by FIG. 9, as a function of the angular displacement.

Next, we constructed an isolator using the FIG. 5 method as an example of a polarization-independent optical isolator by using the above pigtails at the optical fiber ends. The shape of the first birefringent plate was 2 mm square and 1.5 mm thick, the second birefringent plate was 2.2 mm thick. A Faraday rotor of 2 mm square and a Bi-substituted rare earth iron garnet film of about 200 μm thickness were used. Beams from the reverse direction separated into ordinary and extraordinary beams and did not couple with the entrance side pigtails due to an approximately 220 μm shift in the beam axis. The reverse insertion loss was −45 dB. In addition, the insertion loss including coupling loss at the pigtail segment was −1.2 dB, and a return loss of −55 dB was obtained at the entrance side pigtail.

From the above examples, we were able to confirm that the pigtail coupling system of this design exhibits performance characteristics greater than the tolerance level as a polarization-independent optical isolator. In addition, from the previously described formulae, the beam reflected at the entrance side spherical lens curvature surface and returned to the SMF gained more Gaussian beam expansion as the spherical lens distance L increased, and the beam entering the SMF core, i.e., the return loss is reduced. When the return loss of pigtails with an R=200 μm spherical lens was actually measured, −45 dB resulted, confirming the inferior performance in the case of R=273 μm with a return loss of −55 dB (individually −56 dB).

Figure 17:
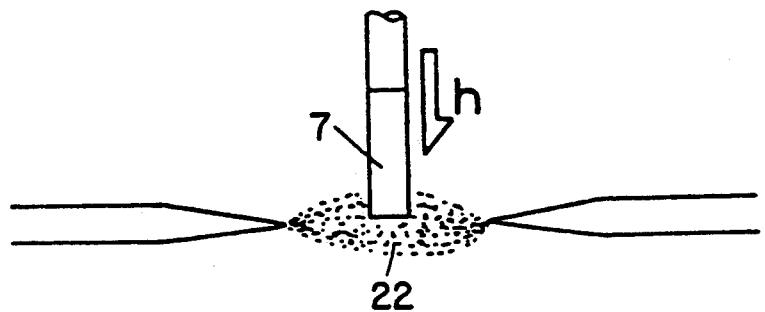
FIG. 17 is schematic diagram showing arc-discharge thermal fusion in accordance with this invention.

The tip sphere was manufactured, as shown in FIG. 17, by feeding the quartz fiber 7 into an arc-discharge thermal fusion unit 22 to form the curvature of radius R=200 μm. The feed length h of the quartz fiber 7 was obtained from the Formula 5:

$$\pi r^2 h = 4/3 \, \pi R^3 \qquad \text{[Formula 5]}$$

such that the volume for h (cylinder) becomes the volume of the tip sphere. As a result, a curvature of R=200 μm was obtained with a feed length, h=2.73 mm.

The fiber lens can be directly fused to the optical fiber which, unlike the adhesive method, produces highly reliable optical parts; because of the absence of interfaces, the reflection loss is low, and a high coupling efficiency can be produced. Unlike conventional fiber collimators which are adjusted to a lens system at high tolerance, it has advantages of producing an optical terminal system which includes a pigtail unit at a low cost.

Figure 18:
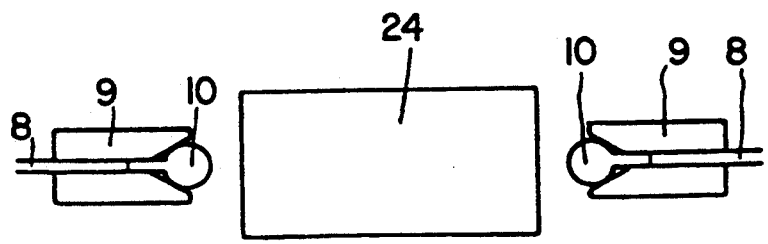
FIG. 18 is a schematic diagram of a pigtailed polarization independent optical isolator of this invention.

In manufacturing the spherical tip fiber, the matching of the volume of the quartz fiber feed length with the sphere volume is easily controlled by the thermal fusion technique. Since the sphere is formed by surface tension, it can be produced as a true sphere without a deterioration in concentricity; without the problems of grinding flaws or a work-denatured layer occurring in the grinding method, wasted time is eliminated. Furthermore, since it is structured for light return loss, there is no need for internal structural changes or adjustment of the optical axis as in the case of a conventional collimator. Based on these advantages, it can be applied widely as an optical fiber array coupling unit for optical isolators, optical switches, optical merging/branching filters, etc. by further adjusting the curvature. FIG. 18 is a schematically depicts a polarization-independent optical isolator with pigtails constructed in accordance with this invention and which comprises an SMF main optical fiber 8, a ferrule for protecting the tip 9, an optical fiber 10, consisting of an optical entrance formed a non-doped silica fiber lens entrance at the tip, and a spherical lens for optical converging, and a polarization-independent optical isolator main body 24. Details of an adjustable ferrule 9 are described below relative to FIG. 25.

FIG. 19(a) shows a process for forming the spherical lens segment at the optical fiber terminal end as an example of this invention. The non-doped silica fiber (NDSF) 7 and the single mode fiber (SMF) 8 are fused into the spherical lens segment 10. In other words, the supporting tool which supports the optical fiber is connected to a motor, the NDSF is lowered toward the heating unit by length M, and the sphere is formed. Diverse heating modes are available; for example, image heating, arc-discharge heating, resistance heating, etc. In this example, we used a commercial fiber fusing unit with an arc-discharge. In addition, a drive system using a stepping motor was used for feeding a set length of fiber.

FIG. 19(b) shows a completed state of the formed beam entry segment 26 and spherical lens segment 10. The major characteristics of this invention are that the length L of the beam expansion segment, i.e., the total length of the beam entry segment 26 and the spherical lens segment 10, and the radius of curvature R of the spherical lens can be freely designed as well as controlled at the same time. As an example, consider a collimator for optical devices that requires a 6-mm interlens space. As has been already proposed by the inventors in the patent application H3-17022, L can be derived from Formula 6 when the beam waist z=3 mm. When the tip structure of FIG. 1b is considered at this time, i.e., when the beam propagates a distance L through the silica fiber from the SMF core, $2W_o$ enlarges into a 2W light flux at the tip of the spherical lens segment, and forms a beam waist point at the distance z position, L being is derived from Formula 1 using refractive index n of $SiO_2$ at wavelength 1.

$$L = \sqrt{\left(\frac{W}{W_0}\right)^2 - 1} \cdot \left(\frac{\pi n w_0^2}{\lambda}\right) \quad \text{[Formula 6]}$$

Figure 20:
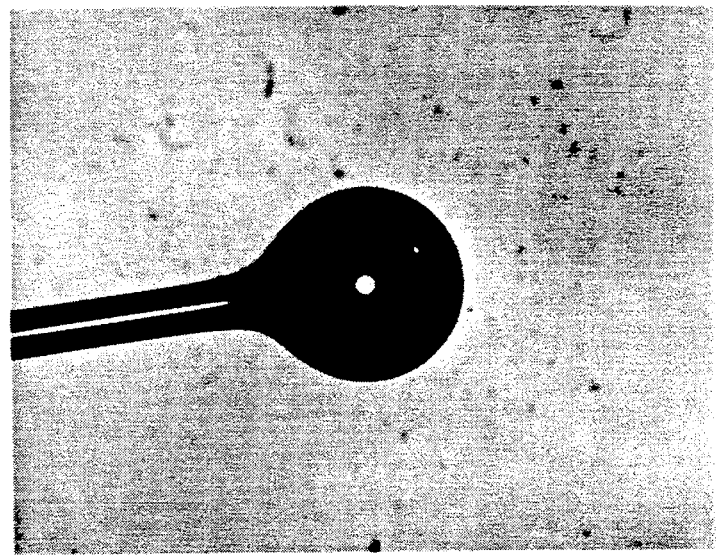
FIG. 20 is a side view photograph of an optical fiber terminal of this invention (magnification, ×30)

In other words, the optical fiber diameter or the spread of the spherical lens segment can be also considered by controlling L; in this case, L=850 μm and 2W=95 μm are the optical conditions. At this time, the radius of curvature of the lens is obtained unequivocally from the restriction, z=3 mm, and determined as R=265 mm. When the length M of the fused silica optical fiber is calculated based on the above conditions, M=6672 μm results. However, in actual construction, it is necessary to make M longer than the calculated value. This is seen from the side view photograph in FIG. 20 of an example of the optical fiber terminal constructed according to this invention. The bases of the silica beam expansion segment and the spherical lens forming segment are more widely spread. When this is considered, it is necessary to use a length of silica fiber segment which is longer than the calculated length at the beginning.

Figure 21:
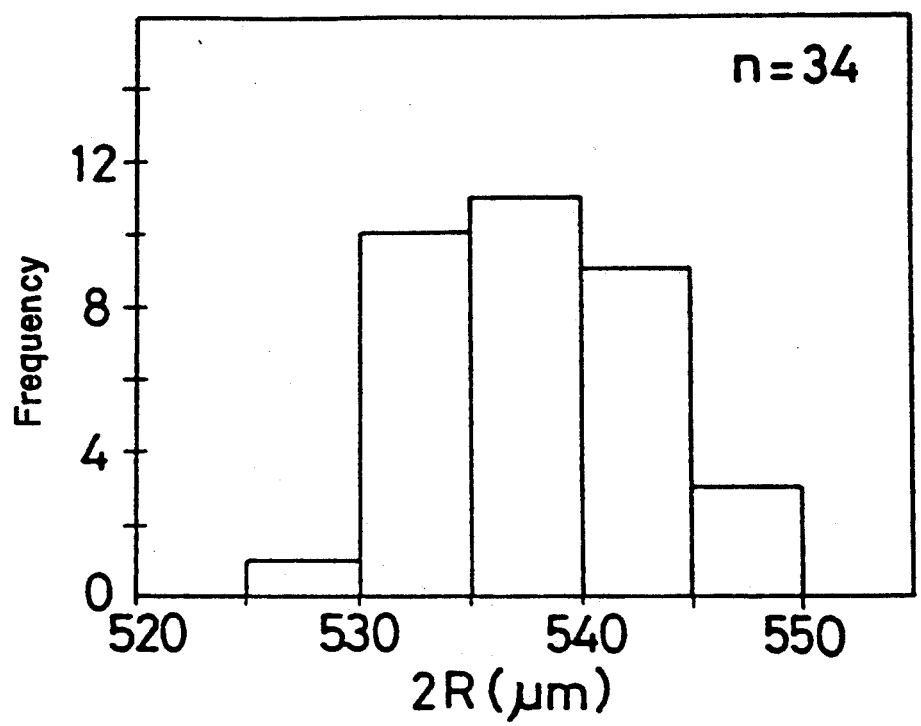
FIG. 21 is a graph showing the distribution of the radii of curvature R of spherical lenses at the optical lens of 34 terminals produced in accordance with this invention.
Figure 22:
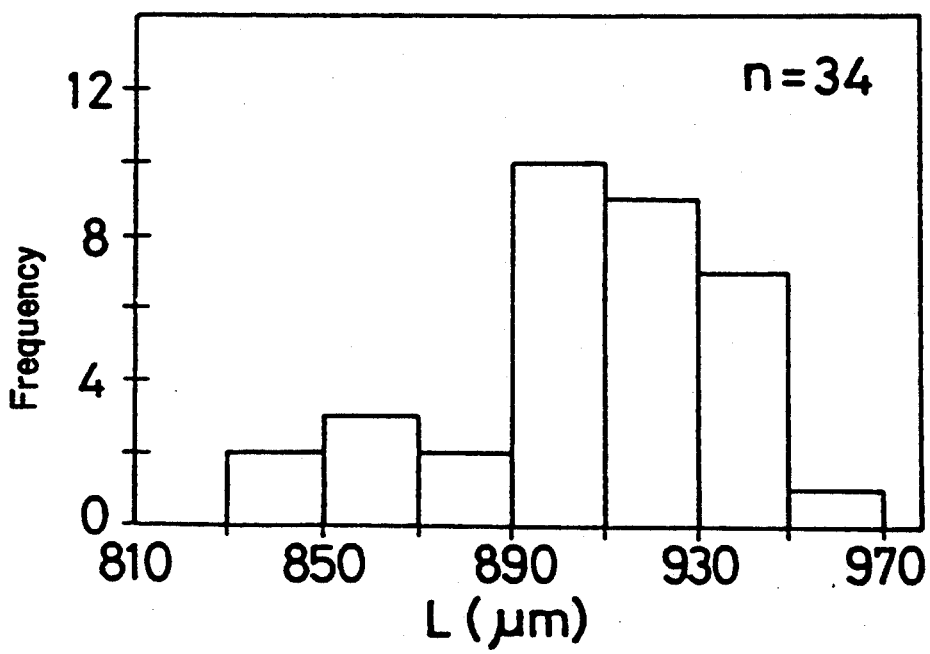
FIG. 22 is a graph showing the distribution of the length of the beam expansion segments of 34 optical fiber terminals produced in accordance with this invention.

In addition, in the arc-discharge fusion method, silica disperses slightly during the melting process; this amount should also be taken into account in advance. In the case of a resistance heating method, gradual heating allows working under conditions close to the calculated length. These discrepancies with the calculations are dependent on the fusion-heating method and are not an issue related to the main point of this invention. FIGS. 21 and 22 show the frequencies for the radius of curvature R of the spherical lens and the length L of the beam expansion segment extending from the part fused to the SMF to the lens surface in 34 examples constructed based on the above-mentioned method for manufacturing. As can be seen from the graphs, the optical fiber terminals with the lens manufactured according to this invention have uniform shapes and are suitable for mass production on an industrial scale.

Other examples relating to this invention include an optical fiber terminal having a configuration in which the optical fiber beam axis is off the center of the spherical lens, which is also a technical element related to this invention. In other words, in the configuration in which the first optical fiber 7 and a second optical fiber 8 having the same outer diameter, composed of a beam entrance and a beam converging spherical lens unit, and having a single refractive index of an equivalent value to that of the first optical fiber core, are fused at the side of the second optical fiber at which the optical fiber beam enters from the first optical fiber; the length the second optical fiber is set so that the second optical fiber will have a volume approximately equal to that required for the spherical lens segment and the beam entry segment in order to obtain the desired sizes in the radius of curvature R of the spherical lens segment and the length L of the beam expansion segment, which includes the beam entry segment and the spherical lens segment for beam convergence.

Figure 23:
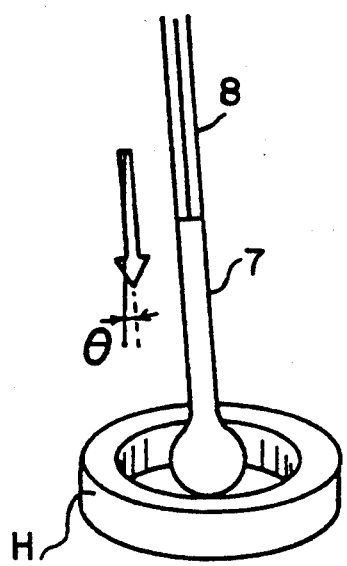
FIG. 23 is a perspective view of another example of manufacturing equipment for producing the optical fiber spherical lens according to this invention.
Figure 24:
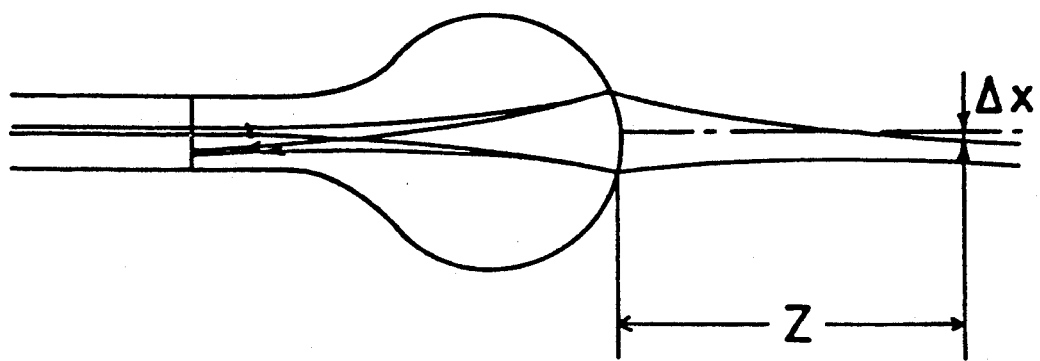
FIG. 24 is a schematic diagram of the optical fiber terminal based of FIG. 23.

Next, after the first optical fiber is fused, the manufacturing method involves stabilizing the fused optical fiber segment by tilting at a minute angle θ to the vertical direction, lowering it toward the heat source installed below the optical fiber while maintaining the minute angle H with the fused side down until the spherical volume with the radius of curvature R is formed. The configuration of the optical fiber terminal manufactured in this manner is also included in this invention. FIG. 23 is a schematic diagram for manufacturing by tilting with respect to the optical axis. When the optical fiber is tilted by a minute angle θ and lowered, as a consequence of the fused sphere tip hanging down vertically, most of the SMF exit beams exhibit a beam waist at a position with a ΔX shift from the fiber beam axis at distance z, as shown in the diagram of FIG. 24.

An optical fiber terminal with a tilted tip manufactured in a similar manner was stabilized at the interlens space 2z and the coupling efficiency was determined as 0.8 dB, which is almost equivalent to the splice efficiency of 0.7 dB of an ordinary tip; optical coupling is at an allowable level. On the other hand, the return loss attributable to the lens surface is reduced due to the fact that lens surface reflection is shifted by having the spherical lens off center with respect to the SMF core as in FIG. 24. Mean values of the actual measurements from the previously mentioned 34 examples were 48 dB for the straight-fused optical fiber and 59 dB for the tilted optical fiber terminal. The return loss performance obtained was equivalent to that of the tilted and polished optical fiber.

A method for constructing an optical coupler in accordance with this invention comprises inserting an optical fiber and a fiber collimator into a ferrule support with a spherical formed at the tip, and a spherical segment is clamp-secured with a coupling unit consisting of a flange and a cap which come in contact with the spherical segment. By designing the coupling structure to have a spherical surface which is rotatable at the coupling unit, the spherical segment of the ferrule support and the coupling unit are fixed at a position with the least amount of splice loss, i.e., the position of minimum angle shift, by measuring the optical coupling losses and collimating.

Figure 25:
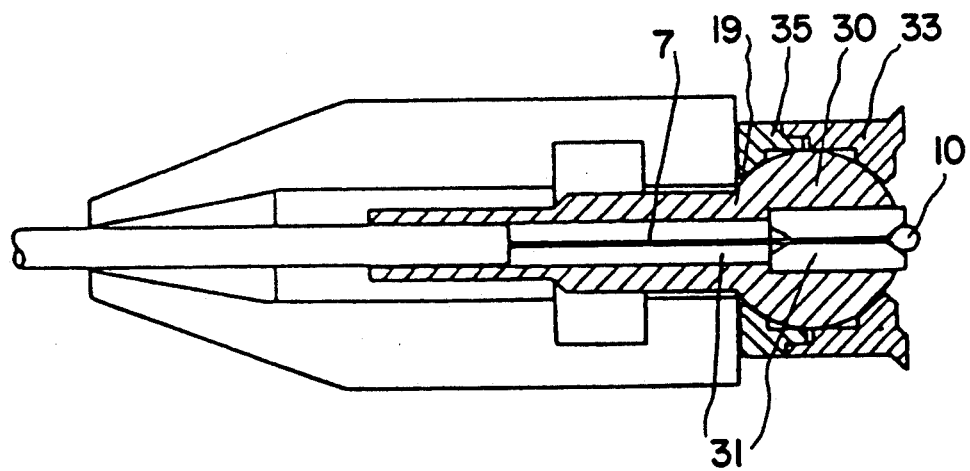
FIG. 25 is a schematic diagram of an optical coupler in accordance with the present invention.

The configuration of the optical coupler of this invention comprises, as shown in FIG. 25, a ferrule support 29, having a through-hole and spherical segment 30 formed at its tip, in which an optical fiber 7, having a spherical portion 10 with a tip beam converging function, and an optical fiber protecting material 31 are inserted and stabilized in the through-hole along its central axis. The spherical segment 31 is clamp-secured with a coupling unit having a flange 33 and a cap 35, one being in contact with segment 31 at the optical fiber side and the other engaging the spherical surface side. For optical coupling in accordance with this invention the optical fiber 7 with a tip beam converging function and the optical fiber protecting material are inserted and stabilized in the through-hole along its central axis; and the ferrule support unit with the tip sphere, which is rotatable, is fixed by the coupling unit after adjusting the ferrule support to be positioned to produce an optimal beam converging function. A pair of such optical fiber terminal configurations are positioned and coupled together in opposition with their lens surfaces facing each other. An optically functional part can be placed between the lenses of the second optical fibers and this optically functional part can be, e.g., a polarization-independent optical isolator, thus forming an optical system as shown in FIG. 18.

This invention also provides a converging beam coupling method (as opposed to a collimator coupling method) for providing fiber coupling suitable for mass-production. In other words, by having the structure comprising the beam-expansion segment, which maximally enlarges the beam guided from the SMF to the lens exit surface, and a converging-lens segment with a smaller radius of curvature than would be found on a lens used for collimator coupling, such a lens serving for converging the enlarged beam into as small a cross-section as possible, both (i) relaxation of adjustment precision with respect to tilt-angle shifts, and (ii) control of the reflective return beam, can be achieved. This aspect of the invention is explained below by comparing the collimator coupling method with the converging beam coupling method of this invention.

When optical coupling is performed between fibers by positioning a pair of microlensed fibers facing each other, and the radii of the beam waists formed by the exit beams from the opposing lenses are $W_1$ and $W_2$ the coupling efficiency $\theta$ is;

$$\eta = \frac{4}{\left[ \frac{W_1}{W_2} - \frac{W_2}{W_1} \right]^2} \quad \text{[Formula 7]}$$

Figure 26:
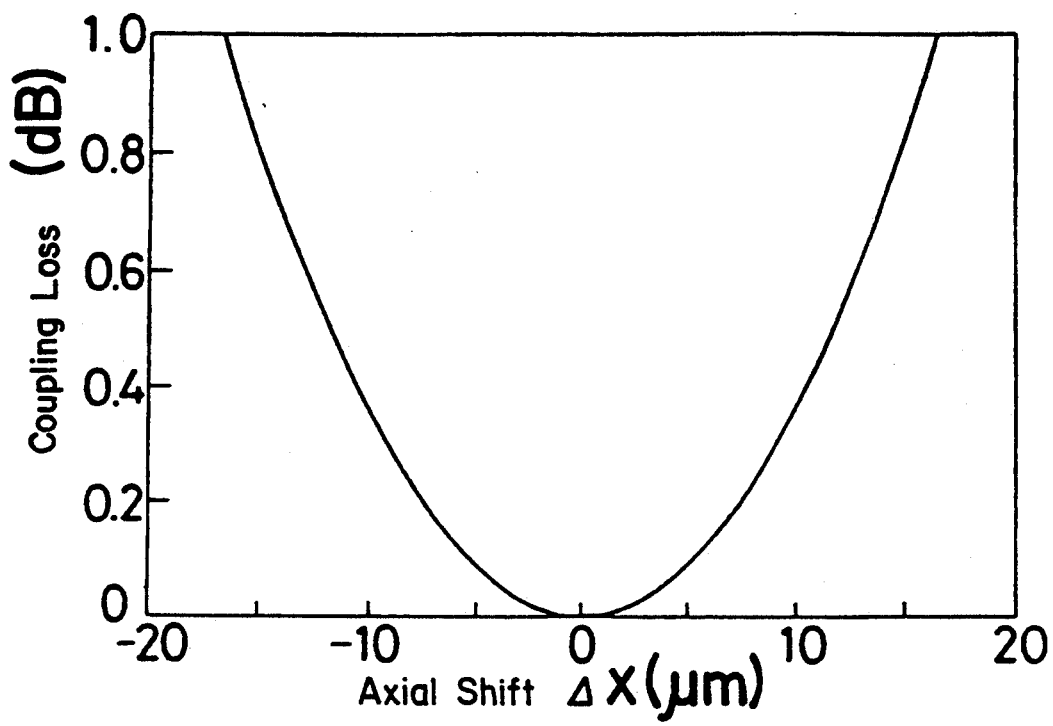
FIG. 26 is a graph showing calculated values of coupling due to axial shifts $\Delta X$.
Figure 27:
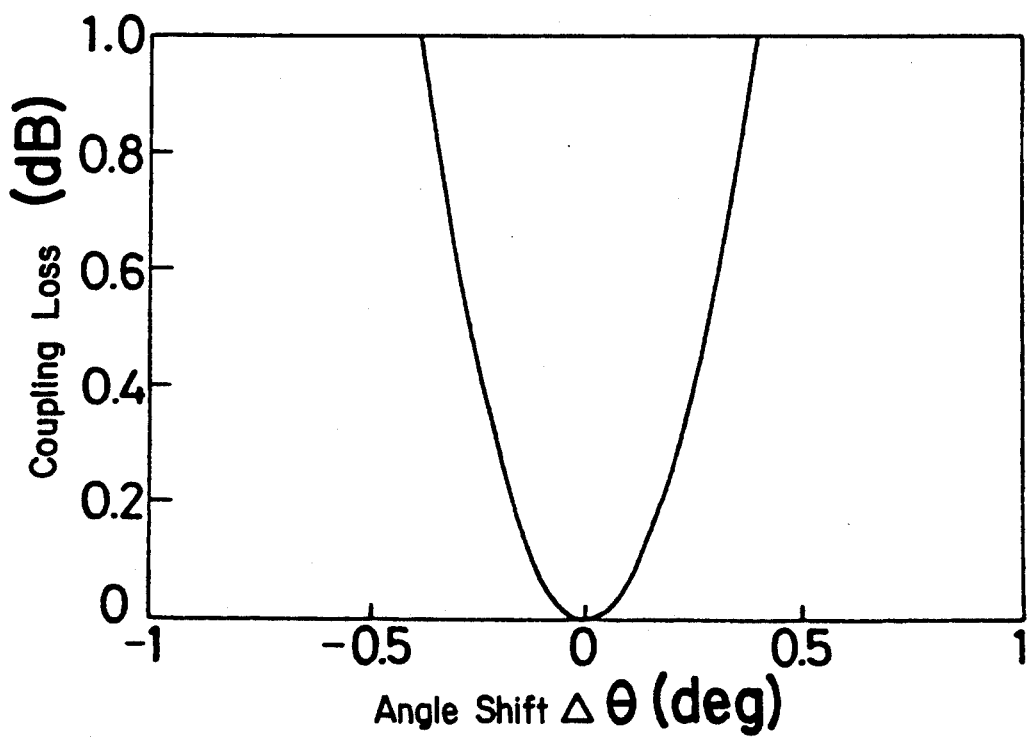
FIG. 27 is a graph showing calculated values of coupling due to tilt-angle shifts $\Delta \theta$.

When a restricted propagation distance z is set, and collimator conditions of L and R are established, the relationships of the optical splice loss to $\Delta\theta$ and $\Delta X$ produces the results shown in FIGS. 26 and 27. In this case, the collimator conditions, for example, when z=5 mm is assumed as the proper distance for inserting a micro-optical part, are L=890 μm and R=247 μm. From these graphs, $\Delta\theta$ results in a higher precision than $\Delta X$ under the collimator conditions. Incidentally, the beam diameters at the lens exit and beam waist at this time are approximately 100 μm and 72 μm respectively.

Figure 28:
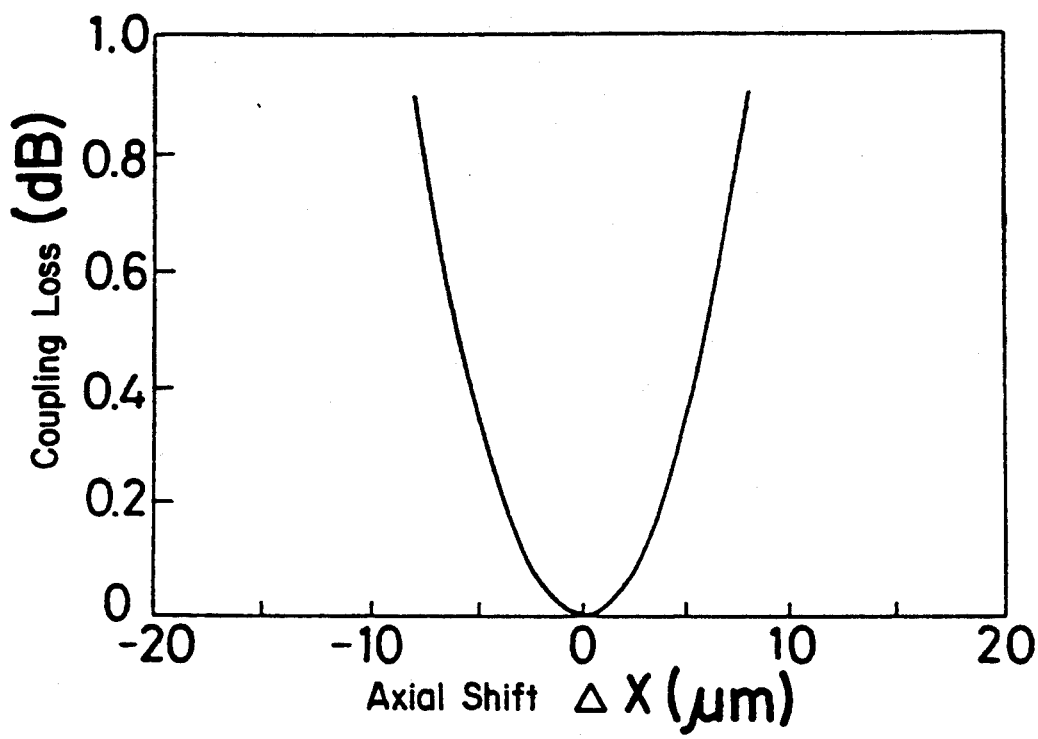
FIG. 28 is a graph showing calculated values of coupling losses due to axial shifts $\Delta X$ with this invention.
Figure 29:
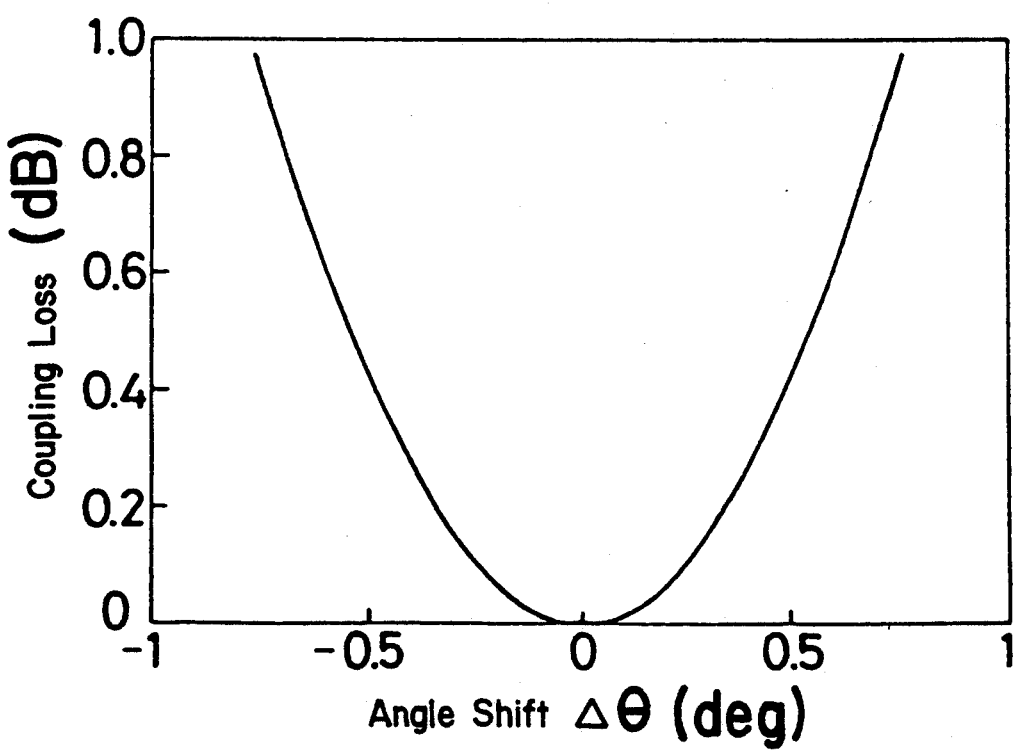
FIG. 29 is a graph showing calculated values of coupling due to tilt-angle shift $\Delta \theta$ with this invention.

On the other hand, when we used a converging beam in which the focal distance is positioned at the lens side according to this invention under the collimator conditions in order to relax $\Delta\theta$, the relationships of optical coupling loss to $\Delta X$ and $\Delta\theta$ are as shown in FIGS. 28 and 29, respectively. A beam of approximately 140 μm at the lens exit has converged to approximately 35 μm at the beam waist position. In other words, in order to reduce the beam waist diameter when z is stipulated, it is essential to enlarge the beam diameter at the lens exit surface and lengthen the beam expansion segment L to cut it down using a lens with a small curvature. As is clear from the graphs, the tolerances for $\Delta\theta$ and $\Delta X$ have been reversed in comparison to collimator conditions. In short, one can see that the increased range of tolerance attributable to beam angle shifts, which is an objective of this invention, is achieved by using a convergent beam for optical coupling.

Figure 30:
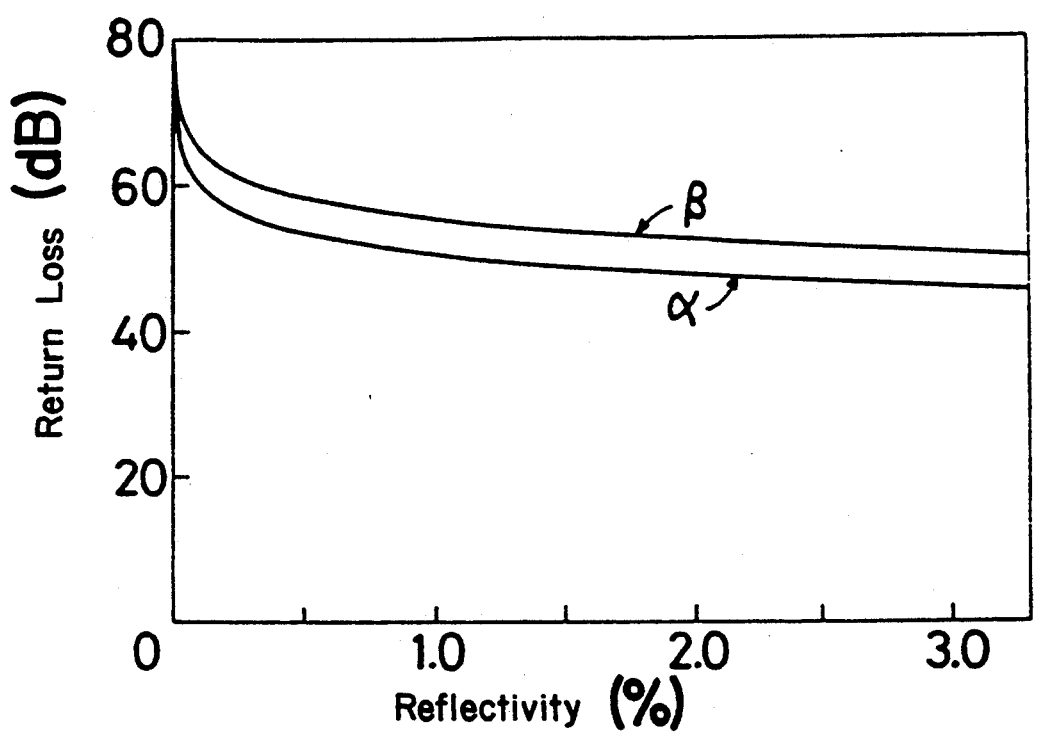
FIG. 30 is a graph showing the relationship between reflectivity and reflection return loss with the present invention.

Next, with respect to the reflection return beam, the return beam fed back to the fiber results in beam lines of $$(M) = \begin{pmatrix} 1 & z \\ 0 & 1 \end{pmatrix} \begin{pmatrix} 1 & 0 \\ -\frac{2}{R} & 1 \end{pmatrix} \begin{pmatrix} 1 & L \\ 0 & 1 \end{pmatrix} = \begin{pmatrix} A & B \\ C & D \end{pmatrix} \quad \text{[Formula 8]}$$

and from the beam waist conditions, $$A = 1 - 2Z/R, \quad B = L + Z(1 - 2L/R) \quad \text{[Formula 9]}$$
$$C = -2/R, \quad D = 1 - 2L/R$$

and $$W = \sqrt{\frac{\lambda(B^2 a^2 + A^2)}{\pi n a(AD - BC)}} \quad \text{[Formula 10]}$$

are derived, and the coupling efficiency of the reflection return beam, $$\eta r = \frac{4W_0^2 W_V^2}{(W_0^2 + W_V^2)^2 + \lambda^2(L + Z)^2/\pi^2} \cdot Rf \quad \text{[Formula 11]}$$

is obtained. Here, $W_O$ and $W_V$ represent the SMF end and a hypothetical radius of the waist at the position z respectively. Rf signifies reflectivity. The anti-reflective ability of a film formed at the lens tip and changes in the reflection return beam are shown in FIG. 30. The converging beam coupling $\beta$ according to this invention is smaller than the collimator condition $\alpha$ regardless of the ability of the anti-reflective film. This shows that the another objective of this invention is obtained, i.e., configuration is achieved that is effective in controlling the reflection return beam.

EXAMPLE 1

Assuming a beam waist distance of z=2200 μm and opposing the fiber terminals of a collimator system (L=890 μm, 2R=500 μm) and a converging beam system (L=1250 μm, 2R=590 μm) to a reflecting mirror, the hypothetical coupling efficiency was determined. As shown in Table 2, below, the average for 10 fiber terminals was 0.49 dB for the collimator system and 0.11 dB for the converging beam system showing a sharp improvement. Moreover, marked improvement was found with respect to fluctuations in the values measured in comparison to the collimator system, which confirmed that the configuration is suitable for mass-production.

TABLE 2

| Specimen No. | Coupling Efficiency (dB) | |
|---|---|---|
| | Collimator System | Converging Beam System |
| 1 | 0.44 | 0.31 |
| 2 | 0.18 | 0.15 |
| 3 | 0.89 | 0.01 |
| 4 | 0.67 | 0.04 |
| 5 | 0.40 | 0.06 |
| 6 | 0.32 | 0.29 |
| 7 | 0.13 | 0.21 |
| 8 | 0.86 | 0.01 |
| 9 | 0.79 | 0.02 |

TABLE 2-continued

| Specimen No. | Coupling Efficiency (dB) | |
|---|---|---|
| | Collimator System | Converging Beam System |
| 10 | 0.19 | 0.01 |
| Average | 0.49 | 0.11 |

EXAMPLE 2

Metal collars were installed at the fiber terminals used in Example 1, and a 4.4 mm-long cylinder having parallel ends and a smooth surface which can be fitted with the fiber terminal collar was placed in the beam propagation path. By applying opposite forces to the fiber terminals, the XY axes of the sliding surfaces were adjusted, and coupling efficiency was determined. The results shown in Table 3 were obtained.

TABLE 3

| Specimen No. | Splice Efficiency | |
|---|---|---|
| | Collimator System | Converging Beam System |
| C1 | 1.05 | 0.37 |
| C2 | 1.55 | 0.05 |
| C3 | 0.80 | 0.15 |
| C4 | 0.73 | 0.10 |
| C5 | 1.28 | 0.26 |
| Average | 1.08 | 0.18 |

EXAMPLE 3

An unpolarized optical isolator, comprised of three birefringent crystal plates and a Faraday rotor inserted into a permanent magnet, was integrated into a cylinder part of the optical system using fiber terminals of the converging beam system which was shop-assembled as in Example 2, and was secured by YAG welding. A fiber terminal was YAG-welded in place and the optimal coupling position of the XY surface was determined by sliding the collar of the opposing fiber terminal while tracking the beam at the other end of the cylinder. Once the proper relative position was achieved, the other terminal was permanently secured by YAG welding.

TABLE 4

| Specimen No. | Collimator System (dB) | | Converging Beam System (dB) | |
|---|---|---|---|---|
| | LF | LB | LF | LB |
| I1 | 1.26 | 40.4 | 0.55 | 44.1 |
| I2 | 1.75 | 38.2 | 0.27 | 42.9 |
| I3 | 0.95 | 44.7 | 0.20 | 45.0 |
| I4 | 1.12 | 42.8 | 0.63 | 41.9 |
| I5 | 1.41 | 40.3 | 0.49 | 46.7 |
| Average | 1.29 | 41.3 | 0.43 | 44.1 |

Table 4 shows the optical characteristics of the unpolarized optical isolator for both a collimator system and the focusing beam system of the present invention with respect to both the forward direction insertion loss LF and backward direction insertion loss LB. The configuration of this invention was proven to provide excellent optical coupling and enable improved mass-productivity, as well. In addition, the reflection return beam of the fiber terminal used in this example was 40 dB in an uncoated state, and 58 dB after an anti-reflective film was formed.

We claim:

1. A microlensed optical fiber terminal comprising a first optical fiber spliced to a second optical fiber, said second optical fiber being a non-clad constant refractive index optical fiber having the same outer diameter as the first optical fiber and a single refractive index equivalent to the refractive index of a core of the first optical fiber; and wherein the tip of the second optical fiber is formed into two segments, a first of said two segments being a beam entry segment having a predetermined length, measured from a beam entry end thereof, in which the second optical fiber has the same outer diameter as the first optical fiber, and a second of said two segments being a spherical lens segment to control the exit angle and diameter of an optical beam.

2. A microlensed optical fiber terminal according to claim 1, wherein the predetermined length of the beam entry segment of the second optical fiber is set within a range which precludes an optical beam from coming in contact with the outer circumference of said beam entry segment of the optical fiber.

3. A microlensed optical fiber terminal according to claim 1, wherein an anti-reflective film is formed on the surface of the spherical lens segment at the tip of the second optical fiber.

4. A microlensed optical fiber terminal according to claim 1, wherein a photoabsorbent or a refractive index matching agent having an equivalent or higher refractive index than the refractive index of the second optical fiber is coated onto a neck portion in an area where said predetermined length of the beam entry segment adjoins a spherical portion of the second optical fiber on which said spherical lens segment is formed.

5. A method of manufacturing a microlensed optical fiber terminal in which a first optical fiber is spliced to a second optical fiber, said second optical fiber being a non-clad constant refractive index optical fiber having the same outer diameter as the first optical fiber and a single refractive index equivalent to the refractive index of a core of the first optical fiber; comprising the step of forming a tip segment of the second optical fiber into a spherical lens segment to control the exit angle and diameter of an optical beam by a thermal fusion process, and leaving a predetermined length of the second optical fiber, measured from an end thereof at said first optical fiber, of the same outer diameter as the first optical fiber.

6. A method of manufacturing according to claim 5, wherein the step of forming comprises feeding the tip segment of the second optical fiber into a thermal fusion unit to form the spherical lens segment with a target radius.

7. In a configuration which is composed of a beam entrance unit and a beam converging waveguide and spherical lens unit and in which a first optical fiber and a second optical fiber, the second optical fiber being formed of a non-clad constant refractive index optical fiber having the same outer diameter as the first optical fiber and a single refractive index of equivalent value to the refractive index of a core of the first optical fiber, are spliced by a fusion technique at the side of a beam entrance of the first optical fiber, an optical fiber terminal with a beam entry segment and a microspherical lens segment; wherein the total length of the second optical fiber is long enough for the flux of a Gaussian distributed beam to enlarge at least to 80 $\mu$m or more at an exit of the terminal, and the radius of curvature of a beam converging spherical lens on a tip of the second optical fiber is more than 200 $\mu$m.

8. A polarization-independent optical isolator comprising a fusion-integrated, microlensed optical fiber terminal at optical entrance and exit ends of the polarization-independent optical isolator, each said optical fiber terminal comprising a beam entrance unit and a beam converging spherical lens unit in which a first optical fiber and a second optical fiber are fused at the side of a beam entrance of the first optical fiber, the second optical fiber being formed of a non-clad constant refractive index optical fiber having the same outer diameter as the first optical fiber and a single refractive index of equivalent value to the refractive index of a core of the first optical fiber; wherein the length of the second optical fiber is long enough for the flux of a Gaussian distributed beam to enlarge at least to 80 $\mu$m or more at an exit of the terminal, and the radius of curvature of a beam converging spherical lens on a tip of the second optical fiber is more than 200 $\mu$m.

9. A method for manufacturing an optical fiber terminal in which a first optical fiber is spliced to a second optical fiber having a beam entry segment and an integral spherical lens segment at an end thereof, comprising the steps of determining an initial portion of the second optical fiber which has a length M and that is approximately equal in volume to that required for the beam entry segment and the spherical lens segment in order to obtain desired sizes of a radius of curvature R of the spherical lens segment and a length L of the second optical fiber, which includes the beam entry segment and the spherical lens segment for beam convergence, and feeding the length M of the optical fiber into a heat source located below the optical fiber by lowering the optical fiber vertically until the spherical lens segment with the curvature radius R is formed.

10. A method for manufacturing an optical fiber terminal with a fused, integral microlens in which an optical fiber beam axis is off-center relative to a spherical lens, wherein a first optical fiber is fused with a second optical fiber, said second optical fiber being a non-clad constant refractive index fiber having the same outer diameter as the first optical fiber and a single refractive index equivalent to the refractive index of a core of the first optical fiber, and the second optical fiber being fused to the first optical fiber at a side at which the optical fiber beam enters the second optical fiber from the first optical fiber, then the fused side is inclined at an angle relative to a vertical direction and stabilized, and then, the fused optical fiber segment is lowered toward a heat source while maintaining said inclination until a spherical volume of a desired radius of curvature R is formed.

11. An optical coupler comprising a ferrule support having a spherical segment formed at a tip thereof and a through-hole along its central axis for receiving an optical fiber with a tip beam converging function and an optical fiber protecting material, and a coupling unit for clampingly securing the ferrule support in any of a plurality of positions of angular adjustment relative thereto, said coupling unit having a flange and a cap, which contact spherical surface areas of the spherical segment from opposite sides of the spherical segment.

12. An optical coupling method comprising inserting and stabilizing an optical fiber with a beam converging tip portion and an optical fiber protecting material disposed therearound in a through-hole disposed along a central axis of a ferrule support having a spherical segment formed at a tip thereof; rotating the ferrule support to position the optical fiber so as to produce an optimal beam converging function; fixing the ferrule support with a coupling unit, having a flange and a cap which contact spherical surface areas of the spherical segment from opposite sides of the spherical segment, to maintain the position of the optical fiber; and coupling the optical fiber to another optical fiber.

13. A microlensed optical fiber terminal configuration comprised of a first optical fiber, a second optical fiber, said second optical fiber being a non-clad constant refractive index fiber having the same outer diameter as the first optical fiber, beam entry and beam converging spherical lens portions and a single refractive index of equivalent value to that of a core of the first optical fiber, said first optical fiber being spliced by a fusion technique to the second optical fiber at a beam entrance side thereof; wherein said beam entry and beam converging spherical lens portions have a combined length which is sufficient for the flux of a Gaussian distributed-beam, propagated from the first optical fiber, to expand to at least 80 $\mu$m at an exit surface of the spherical lens portion; and wherein the surface of the spherical lens portion has a radius of curvature greater than 200 $\mu$m; said spherical lens portion comprises a fused, integral microlens which is configured to cause a beam exiting said exit surface to converge at a focal point which is nearer to the lens than would be required by a collimator.

14. An optical system comprised of a pair of microlensed optical fiber terminal configurations each of which includes a first optical fiber, a second optical fiber, said second optical fiber being a non-clad constant refractive index fiber having the same outer diameter as the first optical fiber, beam entry and beam converging spherical lens portions and a single refractive index of equivalent value to that of a core of the first optical fiber, said first optical fiber being spliced by a fusion technique to the second optical fiber at a beam entrance side thereof, said beam entry and beam converging spherical lens portions having a combined length which is sufficient for the flux of a Gaussian distributed-beam, propagated from the first optical fiber, to expand to at least 80 $\mu$m at an exit surface of the spherical lens portion, and the surface of the spherical lens portion having a radius of curvature greater than 200 $\mu$m, said spherical lens portion comprising a fused, integral microlens which is configured to cause a beam exiting said exit surface to converge at a focal point which is nearer to the lens than would be required by a collimator; wherein the optical fiber configurations are positioned and coupled with the exit surfaces of the second optical fibers facing each other.

15. A microlensed optical system according to claim 14, wherein an optical device is placed between the lenses of the second optical fibers.

16. A microlensed optical system according to claim 15, wherein said optical device is a polarization-independent optical isolator.

17. A microlensed optical fiber terminal comprising a first optical fiber spliced to a second optical fiber, said second optical fiber being a non-clad constant refractive index optical fiber having the same outer diameter as the first optical fiber and a single refractive index equivalent to the refractive index of a core of the first optical fiber; wherein the tip of the second optical fiber is formed into a sphere to control the exit angle of an optical beam; and wherein the second optical fiber has a length which is set within a range which precludes an optical beam from coming in contact with the outer circumference of the second optical fiber.

* * * * *